United States Patent
Du et al.

(10) Patent No.: US 10,110,303 B2
(45) Date of Patent: Oct. 23, 2018

(54) LIGHT-COMMUNICATION SENDING METHODS AND APPARATUS, LIGHT-COMMUNICATION RECEIVING METHODS AND APPARATUS, AND LIGHT COMMUNICATION SYSTEMS

(71) Applicant: BEIJING ZHIGU RUI TUO TECH CO., LTD., Beijing (CN)

(72) Inventors: Lin Du, Beijing (CN); Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 15/524,971

(22) PCT Filed: Oct. 10, 2015

(86) PCT No.: PCT/CN2015/091611
§ 371 (c)(1),
(2) Date: May 5, 2017

(87) PCT Pub. No.: WO2016/074546
PCT Pub. Date: May 19, 2016

(65) Prior Publication Data
US 2017/0346561 A1 Nov. 30, 2017

(30) Foreign Application Priority Data
Nov. 10, 2014 (CN) .......................... 2014 1 0643788

(51) Int. Cl.
*H04B 10/116* (2013.01)
*H04B 10/50* (2013.01)
(Continued)

(52) U.S. Cl.
CPC ......... *H04B 10/116* (2013.01); *H04B 10/502* (2013.01); *H04B 10/516* (2013.01);
(Continued)

(58) Field of Classification Search
CPC .......... G02B 26/001; H04N 2201/0084; H04B 10/116
(Continued)

(56) References Cited

U.S. PATENT DOCUMENTS 8,068,154 B2  11/2011  Jacob et al.
8,249,370 B2  8/2012  Kanamori et al.
(Continued)

FOREIGN PATENT DOCUMENTS

CN  1989716 A   6/2007
CN  101053249    10/2007
(Continued)

OTHER PUBLICATIONS

International Search Report and Written Opinion for Application No. PCT/CN2015/091611, dated Jan. 21, 2016, 10 pages.
(Continued)

*Primary Examiner* — Don N Vo

(57) ABSTRACT

Embodiments of the present application disclose various light-communication sending methods and apparatus, various light-communication receiving methods and apparatus, and various light communication systems. A light-communication sending method comprises: acquiring a first region of an image; determining, according to the first region, information about density distribution of communication information that is to be modulated to light emitted by a light source; and controlling the light source to display the image, and during displaying of the image, modulating, according to the information about the density distribution of the communication information, the communication information to the light emitted by the light source. A light-communication receiving method comprises: acquiring a first region of an image; adjusting pixel density distribution of an image sensor according to the first region; and cap-
(Continued)

turing the image by using the adjusted image sensor, and during capturing of the image, receiving communication information modulated by a transmit end to light emitted by a light source that displays the image. The present application helps implement capturing of an image of differentiated definition and receiving of differentiated communication information density by a receiver end, and improves the transmission efficiency of communication information.

45 Claims, 8 Drawing Sheets

(51) Int. Cl.
    *H04B 10/516*     (2013.01)
    *H04B 10/60*     (2013.01)
    *H04N 5/341*     (2011.01)
    *G06T 7/11*     (2017.01)

(52) U.S. Cl.
    CPC ............ *H04B 10/60* (2013.01); *H04N 5/341* (2013.01); *G06T 7/11* (2017.01)

(58) Field of Classification Search
    USPC ......................................................... 398/118
    See application file for complete search history.

(56) References Cited

U.S. PATENT DOCUMENTS

| | | |
|---|---|---|
| 8,538,276 B2 | 9/2013 | Shimada et al. |
| 9,729,233 B2 * | 8/2017 | Nishino ........... H04B 10/07953 |
| 2005/0219469 A1 | 10/2005 | Chan et al. |
| 2009/0002265 A1 * | 1/2009 | Kitaoka ................. G09G 3/003 345/4 |
| 2010/0265385 A1 | 10/2010 | Knight et al. |
| 2011/0018911 A1 | 1/2011 | Kitaoka et al. |
| 2011/0066733 A1 * | 3/2011 | Hashimoto ....... G06F 17/30902 709/227 |
| 2012/0133815 A1 * | 5/2012 | Nakanishi .......... H04B 10/1141 348/333.02 |
| 2013/0251374 A1 | 9/2013 | Chen et al. |
| 2015/0350531 A1 * | 12/2015 | Ishida ................. H04N 5/23219 348/349 |

FOREIGN PATENT DOCUMENTS

| | | |
|---|---|---|
| CN | 101156434 | 4/2008 |
| CN | 101593469 | 12/2009 |
| CN | 102006120 | 4/2011 |
| CN | 102282590 A | 12/2011 |
| CN | 103873778 | 6/2014 |
| CN | 103957060 | 7/2014 |
| CN | 103986517 | 8/2014 |
| CN | 104092953 | 10/2014 |
| CN | 104410845 | 3/2015 |
| JP | 2006129411 A | 5/2006 |
| WO | 2010/062029 | 6/2010 |

OTHER PUBLICATIONS

AN1562, High Resolution RGB LED Color Mixing Application Note, Microchip, Oct. 28, 2013, 16 pages.

Choi et al., "Visible Light Communication with Color and Brightness Control of RGB LEDs," ETRI Journal, Oct. 2013, vol. 35, No. 5, p. 927-930.

* cited by examiner

LIGHT-COMMUNICATION SENDING METHODS AND APPARATUS, LIGHT-COMMUNICATION RECEIVING METHODS AND APPARATUS, AND LIGHT COMMUNICATION SYSTEMS

RELATED APPLICATION

This application is a National Phase Application of International Application No. PCT/CN2015/091611, filed on Oct. 10, 2015, which claims the benefit of priority to Chinese Patent Application No. 201410643788.8, filed on Nov. 10, 2014, and entitled "Light-communication Sending Methods and Apparatus, Light-communication Receiving Methods and Apparatus, and Light Communication Systems", each of which is incorporated in the present application by reference herein in its entirety.

TECHNICAL FIELD

The present application relates to the field of light communication technologies, and in particular, to various light-communication sending methods and apparatus, various light-communication receiving methods and apparatus, and various light communication systems.

BACKGROUND

A visible light communication (VLC) technology is a communication method in which an optical signal is directly transmitted in air by using light within a visible light wave band as an information carrier instead of a cable channel, such as an optical fiber.

The VLC using a light source such as a light emitting diode (LED) is based on a fast switch speed characteristic of a light source, using a high-speed modulation optical signal that is invisible to the naked eye and emitted by a large indoor/outdoor display screen, lighting equipment, an annunciator, or a headlight/tail light of an automobile equipped with an LED to modulate and transmit communication information, and then, receiving and demodulating the optical signal by a receiver end, to obtain corresponding communication information.

An image sensor is an element configured to convert an image signal into an electrical signal. An application of the image sensor as a receiver end in light communication has attracted general attention of people. For example, the image sensor not only can be used to capture light information of an image, but also can receive an optical signal, to which communication information is modulated, of a transmit end as a receiver end in a light communication technology; and some image sensors may further demodulate communication information from these optical signals.

SUMMARY

A brief summary about the present application is given hereinafter, so as to provide a basic understanding about certain aspects of the present application. It should be understood that the summary is not an exhaustive summary about the present application. It is neither intended to determine critical or important parts of the present application, nor intended to limit the scope of the present application. Its purpose is merely giving some concepts in a simplified form, to be taken as the preamble to be described later in more detail.

The present application provides various light-communication sending methods and apparatus, various light-communication receiving methods and apparatus, and various light communication systems.

In a first aspect, embodiments of the present application provide a light-communication sending method, comprising:

acquiring a first region of an image;

determining, according to the first region, information about density distribution of communication information that is to be modulated to light emitted by a light source; and controlling the light source to display the image, and during displaying of the image, modulating, according to the information about the density distribution of the communication information, the communication information to the light emitted by the light source.

In a second aspect, the embodiments of the present application provide a light-communication receiving method, comprising:

acquiring a first region of an image;

adjusting pixel density distribution of an image sensor according to the first region; and capturing the image by using the adjusted image sensor, and during capturing of the image, receiving communication information modulated by a transmit end to light emitted by a light source that displays the image.

In a third aspect, the embodiments of the present application provide a light-communication sending apparatus, comprising:

a first-region acquisition module, configured to acquire a first region of an image;

a communication information density distribution information determining module, configured to determine, according to the first region, information about density distribution of communication information that is to be modulated to light emitted by a light source; and a control module, configured to control the light source to display the image, and during displaying of the image, modulate, according to the information about the density distribution of the communication information, the communication information to the light emitted by the light source.

In a fourth aspect, the embodiments of the present application provide a light-communication receiving apparatus, comprising:

a first-region acquisition module, configured to acquire a first region of an image;

a pixel density adjustment module, configured to adjust pixel density distribution of an image sensor according to the first region; and a control module, configured to capture the image by using the adjusted image sensor, and during capturing of the image, receive communication information modulated by a transmit end to light emitted by a light source that displays the image.

In a fifth aspect, the embodiments of the present application provide a light communication system, comprising the foregoing light-communication sending apparatus and the foregoing light-communication receiving apparatus.

According to the technical solutions provided in the embodiments of the present application, according to a first region of an image, a transmit end determines density distribution of communication information that is to be modulated to light emitted by a light source, to cause the determined density distribution of the communication information to match the foregoing division of the image; during displaying of the image, according to information about the density distribution of the communication information, the communication information is modulated to the light emitted by the light source, to cause density of the communication information, which is modulated to the light corresponding to different regions of the image and emitted by the light source, to be different during displaying of the image, so that the quantities of actually modulated communication data, which correspond to the different regions of the image, are distributed in a differentiated manner; and a receiver end may acquire, in a differentiated manner, communication information that has different density and is configured to present different regions of the image during capturing of the image, thereby improving a transmission rate of communication information, and better meeting diversified actual application demands of users.

These and other advantages of the present application will be more evident through the following detailed description about optional embodiments of the present application with reference to the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components. The drawings together with the following detailed description are comprised in the specification and form a part of the specification, and are configured to further exemplify alternative embodiments of the present application and explain the principle and advantages of the present application. In the drawings.

Figure 1:
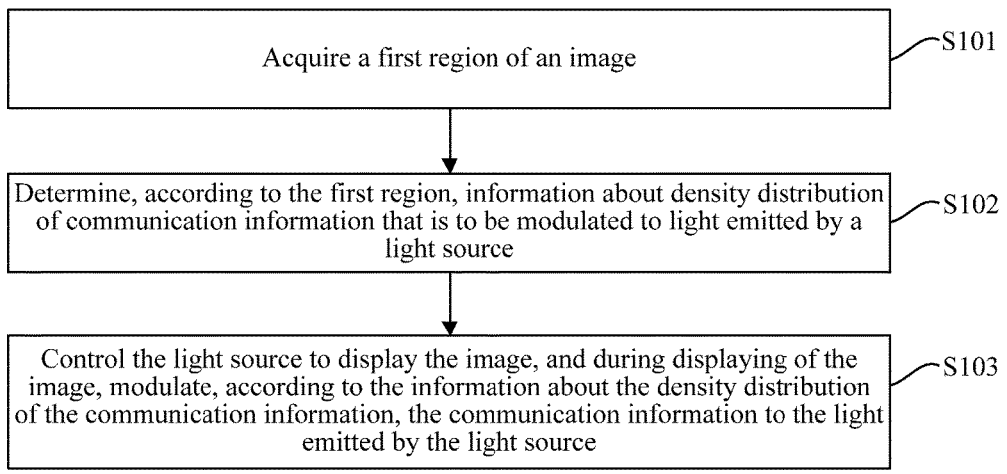
FIG. 1 is a flowchart of a light-communication sending method, according to an embodiment of the present application.

Those skilled in the art should understand that, elements in the accompanying drawings are merely shown for simplicity and clearness, and may not be drawn proportionally. For example, the sizes of some elements in the accompanying drawings may be enlarged relative to other elements, so as to help improve understanding of the embodiments of the present application.

DETAILED DESCRIPTION

Exemplary embodiments of the present application are described below in detail with reference to the accompanying drawings. For the sake of clarity and simplicity, not all the features of actual implementations are described in the specification. However, it should be understood that, lots of decisions specific to implementations must be made during development of any such actual embodiment, so as to achieve specific goals of developers, for example, restrictions relevant to systems and services are met, and the restrictions may vary with different implementations. In addition, it should also be understood that, although development work is likely to be very complicated and time-consuming, for those skilled in the art who benefit from the disclosure, the development work is merely a routine task.

Herein, it should also be noted that, in order to avoid blurring the present application due to unnecessary details, only apparatus structures and/or processing steps closely related to solutions according to the present application are described in the accompanying drawings and the specification, but representation and description about members and processing having little to do with the present application and known to those of ordinary skill in the art are omitted.

Specific implementations of the present application are further described in detail below with reference to the accompanying drawings (in which like elements are denoted by like reference numerals) and embodiments. The following embodiments are intended to describe the present application, but not to limit the scope of the present application.

It should be understood by those skilled in the art that the terms such as "first" and "second" in the present application are merely intended to distinguish different steps, devices or modules, etc., which neither represent any particular technical meaning nor indicate a necessary logical sequence between them.

FIG. 1 is a flowchart of a light-communication sending method according to an embodiment of the present application. The light-communication sending method in this embodiment may be performed by a light-communication sending apparatus. The light-communication sending apparatus has an image display function, and can control sending of communication information during displaying of the image by performing the light-communication sending method in an application process, which may be, but is not limited to displaying a static or dynamic image, and a video. A device presentation form of the light-communication sending apparatus is not limited, for example, the light-communication sending apparatus may be a separate component, and the component cooperates and communicates with a display device comprising a light source and an image display function. The display device may comprise, but is not limited to an indoor or outdoor device of a display screen having a light source, and a fixed or movable device of a display screen having a light source; or, the light-communication sending apparatus may be integrated into a display device as a functional module, which is not limited in this embodiment of the present application.

Specifically, as shown in FIG. 1, a light-communication sending method provided in this embodiment of the present application comprises:

S101: Acquire a first region of an image.

The image may be an image to be displayed by a display device, or the image may be a currently-displayed image of a display device, or the like. The display device may display at least one static image, or the display device may display a video and the image may be a frame of image of the video.

The first region is a local region of the image, and it may be determined which local region or local regions of the image are used as the first region according to actual requirements.

S102: Determine, according to the first region, information about density distribution of communication information that is to be modulated to light emitted by a light source.

The image comprises the first region and another region except the first region. In this embodiment of the present application, according to the foregoing division of the image, density distribution of communication information that is to be modulated to light emitted by a light source is determined, to cause the determined density distribution of the communication information to match the foregoing division of the foregoing image. The density of communication information comprises the quantity of communication data that is modulated to light per unit area. For example, in the information about the density distribution of the communication information, communication information density corresponding to light, which is used to display the first region, of the light source is larger, while communication information density corresponding to light, which is used to display another region of the image, of the light source is smaller, thereby presenting differentiated distribution of communication information density corresponding to light, which is used to display different regions of the image, of the light source.

S103: Control the light source to display the image, and during displaying of the image, modulate, according to the information about the density distribution of the communication information, the communication information to the light emitted by the light source.

An optical signal may be received and demodulated by using an image sensor. When a receiver end (such as, a camera and a video camera) is in an application process, such as taking a picture and shooting a video, in addition to acquiring image content within the field of view, the receiver end may also receive an optical signal within the field of view. By demodulating these optical signals, richer communication information related to the image content may be acquired. The communication information may be, but is not limited to a part of image data, and may be stored together with the image data; or the communication information can help the receiver end in setting a control parameter in taking a picture or the like, thereby improving an image capturing quality.

During implementation of this embodiment of the present application, the inventor of the present application finds that, in an application scenario or the like in which an image sensor is used as a receiver end, because resolution of different image sensors may be different, resolution of an image sensor generally reflects its optical signal receiving capability. To adapt to receiving capabilities of a maximum number of image sensors, a transmit end may modulate to light emitted by a light source configured to display an image, communication information with a relatively low density while displaying the image, and communication information density corresponding to different regions of the image may be distributed evenly. However, to a certain degree, the solution will cause a communication information sending capability of a transmit end to be not adaptive to a receiving capability of a receiver end, thereby reducing a delivery efficiency and effectiveness of communication information. Particularly, with appearance of a receiver end comprising an image sensor with adjustable pixel density, an image sensor of a receiver end may adjust its pixel density distribution according to different region division of an image, to cause pixel density of the adjusted image sensor to be distributed in an uneven and differentiated manner: pixel density of a local part of an imaging region is large while pixel density of a local part of the imaging region is small. In this case, if a transmit end still performs light communication in a modulation manner in which communication information with even and same density corresponds to different regions of an image. To enable the receiver end to have a corresponding receiving capability, communication data of the same quantity may be delivered by reducing a delivery rate with a relatively long delivery time. Apparently, the delivery efficiency is relatively low.

However, according to the technical solution provided in this embodiment of the present application, according to the foregoing division (such as, the first region) of an image, a transmit end determines density distribution of communication information that is to be modulated to light emitted by a light source, to cause the determined density distribution of the communication information to match the foregoing division of the image; during displaying of the image, according to information about the density distribution of the communication information, the communication information is modulated to the light emitted by the light source, to cause density of the communication information, which is modulated to the light corresponding to different regions of the image and emitted by the light source, to be different during displaying of the image, so that the quantities of actually modulated communication data, which correspond to the different regions of the image, are distributed in a differentiated manner; and a receiver end may acquire, in a differentiated manner, communication information that has different density and is configured to present different regions of the image during capturing of the image, thereby better meeting diversified actual application demands of users.

According to the technical solution provided in this embodiment of the present application, optionally, in the information about the density distribution of the communication information, communication information density corresponding to light, which is used to display the first region, of the light source is different from communication information density corresponding to light, which is used to display a second region, of the light source, where the second region comprises at least a part of a region of the image except the first region. That is, in the technical solution provided in this embodiment of the present application, density of communication information, which is modulated to the corresponding light, configured to display the first region, of the light source, of the transmit end is corresponding to pixel density of an imaging region, which corresponds to the first region, of an image sensor of the receiver end; and density of communication information, which is modulated to the corresponding light, configured to display the second region, of the light source, of the transmit end is corresponding to pixel density of the imaging region, which corresponds to the second region, of the image sensor of the receiver end. The solution helps the density distribution of the communication information to match the division of the different regions of the image, to cause the quantities of communication data actually modulated by the transmit end, which correspond to different regions of the image, to be distributed in a differentiated manner. For example, if the receiver end adjusts pixel density of an image sensor according to the first region of the image, pixel density of an imaging region, which corresponds to the first region, of the image sensor is larger than pixel density of an imaging region corresponding to the second region. In this case, it may determined that, in the information about the density distribution of the communication information, communication information density corresponding to light, which is used to display the first region, of the light source is larger than communication information density corresponding to light, which is used to display a second region of the image, of the light source. For example, if the receiver end adjusts pixel density of an image sensor according to the first region of the image, pixel density of an imaging region, which corresponds to the first region, of the image sensor is smaller than pixel density of an imaging region corresponding to the second region. In this case, it may determined that, in the information about the density distribution of the communication information, communication information density corresponding to light, which is used to display the first region, of the light source is smaller than communication information density corresponding to light, which is used to display a second region of the image, of the light source. The solution helps the differentiated quantities of actually modulated communication data, which correspond to different regions of the image, of the transmit end, to match differentiated receiving capabilities of different imaging regions of the adjusted image sensor of the receiver end.

Optionally, communication information that is modulated to the corresponding light, which is used to display the first region, of the light source is related to image content of the first region. The communication information may comprise, but is not limited to, a description of the image content of the first region, annotation on a source of the content, and the like. According to the solution, communication information related to the image content of the first region may be modulated to the corresponding light, which is used to display the first region, of the light source, which facilitates demodulation.

Optionally, any one of light-communication sending methods provided in the embodiments of the present application may further comprise: determining that pixel density of an image sensor of a receiver end is adjustable. A specific implementation manner of confirming information whether the pixel density of the image sensor of the receiver end is adjustable is very flexible, for example, whether the pixel density of the image sensor of the receiver end is adjustable may be determined by means of information exchange between a transmit end and the receiver end. For example, a transmit end may also pre-acquire capability information of the receiver end, and according to the capability information of the receiver end, determines whether the pixel density of the image sensor of the receiver end is adjustable. According to the solution, in a case in which it is determined that the pixel density of the image sensor of the receiver end is adjustable, a process of a light-communication sending method as shown in FIG. 1 is triggered to be executed, so as to enable a communication information modulation manner of a transmit end to adapt to a receiving capability of an image sensor of a receiver end. If the pixel density of the image sensor of the receiver end is not adjustable, the transmit end may use, but is not limited to a conventional communication information modulation manner, to reduce a possibility of occurrence of a receiving error. The solution improves universality of this embodiment of the present application.

Optionally, any one of light-communication sending methods provided in the embodiments of the present application may further comprise: sending a pixel density adjustment instruction, wherein the pixel density adjustment instruction is used to instruct the receiver end to adjust the pixel density of the image sensor according to the first region, so that in the adjusted image sensor, pixel density of an imaging region corresponding to the first region is different from pixel density of an imaging region corresponding to the second region. According to the solution, the transmit end initiates an instruction that the receiver end adjusts pixel density, to cause a communication information modulation manner of the transmit end to adapt to a receiving capability of the image sensor of the receiver end, so as to reduce a possibility of occurrence of a receiving error.

Optionally, any one of light-communication sending methods provided in the embodiments of the present application may further comprise: providing information of the first region. A manner in which the transmit end provides information of the first region is very flexible. For example, the information of the first region may be modulated to the light emitted by the light source of the transmit end, so as to enable the receiver end to synchronize the information of the first region by using a light communication resource. For example, the information of the first region may be displayed in a manner of a two-dimensional code or the like, and the receiver end acquires the information of the first region by scanning the two-dimensional code. According to the solution, by providing information of the first region by the transmit end, it helps ensure that information of the first region according to which pixel density of an image sensor is adjusted by a receiver end is the same as information of the first region according to which communication information density differentiation modulation is performed by a transmit end as much as possible.

Optionally, any one of light-communication sending methods provided in the embodiments of the present application may further comprise: providing a determining rule for the first region. The determining rule for the first region refers to a policy about how to extract a first region from an image, for example, human face recognition. The transmit end and the receiver end use a same determining rule to determine first regions of a same image, to cause separately acquired determining results to be as similar and even same as possible. A manner in which the transmit end provides a determining rule for the first region is very flexible. For example, the determining rule for the first region may be modulated to the light emitted by the light source of the transmit end, so as to enable the receiver end to synchronize the determining rule for the first region by using a light communication resource. For example, the determining rule for the first region may be displayed in a manner of a two-dimensional code or the like, and the receiver end acquires the determining rule for the first region by scanning the two-dimensional code. According to the solution, by providing a determining rule for the first region by the transmit end, it helps ensure that information of the first region according to which pixel density of an image sensor is adjusted by a receiver end is the same as the first region according to which communication information density differentiation modulation is performed by a transmit end as much as possible.

In addition to that the transmit end provides information of the first region or a determining rule for the first region, another manner may further be used, for example, the transmit end and the receiver end have a same default determining rule for the first region in advance, or the receiver end acquires information of the first region or a determining rule for the first region through a third party, to enable the transmit end and the receiver end to synchronize the information of the first region. These manners all may be applied to acquisition of the first region in the present application and are not limited in this embodiment of the present application.

A manner of acquiring the first region of the image may be determined according to an actual requirement, and is very flexible.

In one optional implementation, the first region of the image may be determined according to information of a region of interest (ROI), that is, ROI information is acquired; and the first region of the image is determined according to the ROI information. The ROI region may comprise, but is not limited to, one or more of the following: at least one region, selected by a user, of the image (that is, a user selection region of the image), at least one region, gazed by a user, of the image (that is, a user gaze region of the image), and an ROI obtained by the display device by automatically detecting the image. According to the solution, according to the ROI, the first region of the image is determined. The determined first region may be a region corresponding to the ROI, or the determined first region may be a region, corresponding to a non-ROI, of the image, to cause determination of the first region to more fit in with user's actual demands, which can better meet users' personalized application demands.

In another optional implementation, the first region of the image may be determined according to an image analysis result, that is, an image analysis is performed on the image; and the first region of the image is determined according to a result of the image analysis. For example, human face recognition is performed on the image, and according to a recognition result, a human face region is determined as the first region.

For example, movable object recognition is performed on the image, and according to a recognition result, a region corresponding to the movable object is determined as the first region of the image.

According to the solution, the first region may be determined according to an image analysis result of the image, to cause determination of the first region to be more intelligent, thereby improving efficiency and universality of the determination of the first region.

Further, the first region may comprise one or more first sub-regions. In a case in which the first region comprises multiple first sub-regions, the multiple first sub-regions may be continuously distributed in the image, for example, boundaries of the multiple first sub-regions are adjacent; or the multiple first sub-regions may be dispersed in the image, for example, all boundaries of the multiple first sub-regions are not adjacent, or a boundary of at least one of the multiple first sub-regions is not adjacent to boundaries of the other first sub-regions. The solution improves flexibility of determining the first region, and may better meet diversified application demands of users.

In addition, in a case in which the first region comprises the multiple first sub-regions, communication information density corresponding to light, which is used to display the first region, of the light source may be determined according to an actual requirement. That is, in the information about the density distribution of the communication information, all communication information density respectively corresponding to light configured to display different first sub-regions may be same, and may also be different, to better adapt to a receiving capability of an image sensor of a receiver end.

By using the technical solution provided in this embodiment of the present application, a manner in which communication information is modulated to light of a light source of a transmit end unevenly may match differentiated receiving capabilities of different imaging regions of an image sensor of a receiver end. Further, the transmit end may also combine a level modulation manner on the basis of the technical solution of this embodiment of the present application. In this way, although different imaging regions of the image sensor of the receiver end do not have differentiated receiving capabilities, down-sampling receiving may also be performed on the communication information, thereby improving universality of the solution.

In the light-communication sending method provided in this embodiment of the present application, emphasis is put on description from a transmit end side. For description related to other aspects such as interaction between a transmit end and a receiver end, and a receiver end side, reference may be made to the disclosure of other parts of the embodiments of the present application.

Figure 2A:
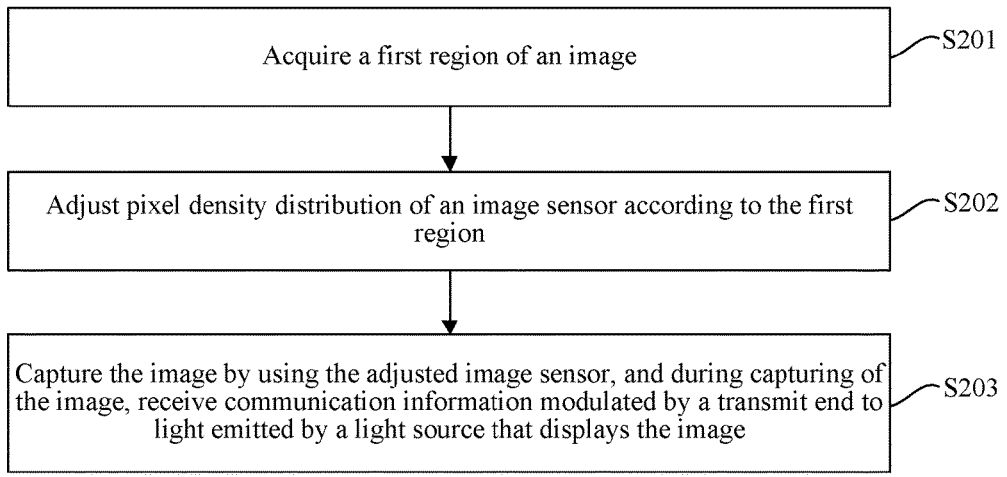
FIG. 2a is a flowchart of a light-communication receiving method, according to an embodiment of the present application.

FIG. 2a is a flowchart of a light-communication receiving method according to an embodiment of the present application. The light-communication receiving method provided in this embodiment of the present application may be performed by a light-communication receiving apparatus, and the light-communication receiving apparatus may perform static or dynamic image, or video capturing control by executing the light-communication receiving method in an application process, which may be, but is not limited to, photographing, camera shooting, photographing and video monitoring. A device presentation form of the light-communication receiving apparatus is not limited, for example, the light-communication receiving apparatus may be a separate component, and the component cooperates and communicates with an image capturing device comprising an image sensor; or, the light-communication receiving apparatus may be integrated into an image capturing device that comprises an image sensor as a functional module, which is not limited in this embodiment of the present application.

Specifically, as shown in FIG. 2a, a light-communication receiving method provided in this embodiment of the present application comprises:

S201: Acquire a first region of an image.

Before capturing an image, the light-communication receiving apparatus may acquire the image displayed by a display device in a manner of previewing or the like. The image may be an image to be displayed by the display device, or the image may be a currently-displayed image of the display device, or the like. The display device may display at least one static image, or the display device may display a video and the image may be a frame of image of the video.

S202: Adjust pixel density distribution of an image sensor according to the first region.

The image sensor is an image sensor with adjustable pixel density, for example, a flexible image sensor. The flexible image sensor comprises a flexible substrate and multiple image sensor pixels forming on the flexible substrate, where the flexible substrate may make changes such as expansion and contraction, or bending to adjust pixel density distribution thereof when meeting a particular condition. In combination with the characteristic that pixel density distribution of the image sensor is adjustable, in this embodiment of the present application, pixel density distribution of the image sensor is adjusted according to the first region of the image, to cause pixel density of different imaging regions of the adjusted image sensor to be distributed in a differentiated manner.

S203: Capture the image by using the adjusted image sensor, and during capturing of the image, receive communication information modulated by a transmit end to light emitted by a light source that displays the image.

According to the light-communication receiving technical solution provided in this embodiment of the present application, during image capturing, all pixels of the image sensor all take part in receiving of an optical signal, that is, take part in image capturing and receiving of communication information. Because the pixel density distribution of the image sensor has been adjusted according to the first region of the image, if the image is captured according to the adjusted image sensor, definition of different regions of the captured image and density of received communication information that is modulated to the light emitted by the light source of the transmit end are distributed in a differentiated manner, which is corresponding to differentiated distribution of actual pixel density of the image sensor. In this way, on one hand, an effect of giving different pixel density to different imaging regions for image capturing may be achieved, to cause definition of different regions of the captured image to be different, and to further help improve the image capturing efficiency without increasing a size of the image; on the other hand, a corresponding receiving capability may also be used to receive communication information, to improve the receiving efficiency of communication information.

Optionally, in the adjusted image sensor, pixel density of an imaging region corresponding to the first region is different from pixel density of an imaging region corresponding to a second region, where the second region comprises at least a part of a region of the image except the first region. Density of communication information received by the imaging region corresponding to the first region is different from density of communication information received by the imaging region corresponding to the second region. That is, in the technical solution provided in this embodiment of the present application, pixel density of an imaging region, which corresponds to the first region, of an image sensor of the receiver end is corresponding to density of communication information, which is modulated to the corresponding light, which is used to display the first region, of the light source, in the transmit end; and pixel density of an imaging region, which corresponds to the second region, of an image sensor of a receiver end is corresponding to density of communication information, which is modulated to the corresponding light, which is used to display the second region, of the light source, in the transmit end. The solution helps pixel density distribution of an image sensor to match division of different regions of an image, to cause differentiated receiving capabilities of different imaging regions of a receiver end to adapt to modulation of differentiated communication information density of a transmit end. For example, if in density of communication information modulated by the transmit end according to the first region of the image, communication information density corresponding to light, which is used to display the first region, of the light source is larger than communication information density corresponding to light, which is used to display a second region, of the light source, after pixel density of an image sensor is adjusted, pixel density, which corresponds to the first region, of an imaging region of the image sensor is larger than pixel density, which corresponds to the second region, of an imaging region. For example, if in density of communication information modulated by the transmit end according to the first region of the image, communication information density corresponding to light, which is used to display the first region, of the light source is smaller than communication information density corresponding to light, which is used to display a second region, of the light source, after pixel density of an image sensor is adjusted, pixel density, which corresponds to the first region, of an imaging region of the image sensor is smaller than pixel density, which corresponds to the second region, of an imaging region. The solution helps differentiated receiving capabilities of different imaging regions of the adjusted image sensor of the receiver end to match the differentiated quantities of actually modulated communication data, which correspond to different regions of the image, of the transmit end.

Optionally, communication information that is modulated to the corresponding light, which is used to display the first region, of the light source is related to image content of the first region. The communication information may comprise, but is not limited to, a description of the image content of the first region, annotation on a source of the content, and the like. According to the solution, the imaging region, which corresponds to the first region, of the image sensor receives communication information that is modulated to the corresponding light, which is used to display the first region, of the light source and is related to image content of the first region, which helps reduce demodulation complexity for the receiver end.

Optionally, the light-communication receiving method provided in this embodiment of the present application may further comprise: providing capability information indicating that the image sensor has adjustable pixel density. A manner of providing capability information whether the image sensor of the receiver end has adjustable pixel density may be as follows: for example, an information exchange manner between the receiver end and the transmit end may be used to provide the transmit end with the capability information; for example, the receiver end may provide the transmit end with the capability information through a third party; and the like. A specific implementation manner is very flexible, which is not limited in this embodiment of the present application. According to the solution, the receiver end provides capability information whether pixel density of the image sensor thereof is adjustable, to cause the transmit end to perform communication information density differentiation modulation correspondingly, thereby improving the transmission efficiency of communication information.

Optionally, before the adjusting the pixel density distribution of the image sensor according to the first region, the method further comprises: receiving a pixel density adjustment instruction; and the adjusting the pixel density distribution of the image sensor according to the first region comprises: adjusting, in response to the pixel density adjustment instruction, pixel density of the image sensor according to the first region of the image. According to the solution, the receiver end responds to the instruction to adjust the pixel density, which initiated by the transmit end, which helps a communication information modulation manner of the transmit end adapt to a receiving capability of the image sensor of the receiver end, so as to reduce a possibility of occurrence of a receiving error.

Optionally, the acquiring the first region of the image comprises: acquiring information of the first region from the transmit end. According to different manners, which are not limited, of providing information of the first region of the transmit end, the receiver end may use a corresponding manner to acquire information of the first region. For example, if the transmit end modulates information of the first region to light emitted by a light source, the receiver end may receive and demodulate the light to acquire the information of the first region. For example, if the transmit end embeds information of the first region in a two-dimensional code, the receiver end may acquire the information of the first region by scanning and parsing the two-dimensional code. The solution helps ensure that information of the first region according to which pixel density of an image sensor is adjusted by the receiver end is the same as information of the first region according to which communication information density differentiation modulation is performed by the transmit end as much as possible.

Optionally, the acquiring the first region of the image comprises: acquiring a determining rule for the first region; and determining the first region of the image according to the determining rule. For example, the receiver end may acquire a determining rule for the first region from the transmit end. In this case, according to different manners, which are not limited, of providing a determining rule for the first region of the transmit end, the receiver end may use a corresponding manner to acquire information of the first region. For example, the receiver end may use a default determining rule, or, acquire the determining rule from a third party or the like. The solution helps ensure that information of the first region according to which pixel density of an image sensor is adjusted by a receiver end is the same as the first region according to which communication information density differentiation modulation is performed by a transmit end as much as possible.

Optionally, according to this embodiment of the present application, a method for adjusting pixel density distribution of the image sensor is very flexible. Optionally, the adjusting the pixel density distribution of the image sensor according to the first region comprises: determining target pixel density distribution information of the image sensor according to the first region; and adjusting pixel density distribution of the image sensor according to the target pixel density distribution information. The target pixel density distribution information is usually configured to represent relevant expectation of pixel density distribution of different regions of the image of a user or device. For example, the first region comprises at least a part of a region of which definition needs to be increased; and in this case, in the target pixel density distribution information, target pixel density corresponding to the first region is larger than target pixel density corresponding to the second region. For example, the first region comprises at least a part of a region of which definition needs to be decreased with relative to comparative definition; and in this case, in the target pixel density distribution information, target pixel density corresponding to the first region is smaller than target pixel density corresponding to the second region. A manner of implementing the foregoing solution is very flexible, and may better meet diversified application demands of users.

In addition to the flexible image sensor, according to this embodiment of the present application, pixel density distribution may further be adjusted based on an image sensor having a controllable deformable material portion. In this case, after the target pixel density distribution information is acquired, pixel density distribution of an image sensor may be adjusted according to the target pixel density distribution information, for example, deformation control information of the controllable deformable material portion may be determined according to the target pixel density distribution information; according to the deformation control information, the controllable deformable material portion is controlled to produce deformation, so as to correspondingly adjust the pixel density distribution of the image sensor through deformation of the controllable deformable material portion. According to the solution, pixel distribution of the image sensor is adjusted through deformation of a controllable deformable material portion. The solution is simple and easy to implement.

The controllable deformable material portion can produce deformation by changing an external effect factor (such as an external field) acting on the controllable deformable material portion, and when the external field acting thereon is cancelled or changed, the deformation of the controllable deformable material portion can be restored. The controllable deformable material portion may be prepared from at least one or more of the following controllable deformable materials: a piezoelectric material, an electroactive polymer, a photostrictive material and a magnetostrictive material.

Figure 2B:
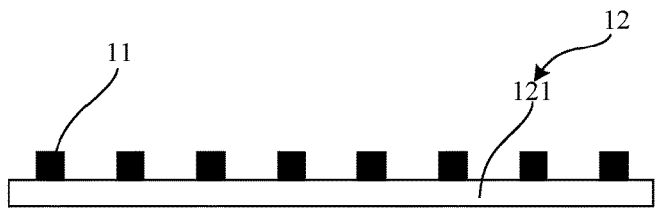
FIG. 2b is a schematic structural diagram of a first image sensor with adjustable pixel density, according to an embodiment of the present application.

FIG. 2b is a schematic structural diagram of an image sensor with adjustable pixel density according to an embodiment of the present application. As shown in FIG. 2b, the image sensor with adjustable pixel density provided in this embodiment of the present application comprises multiple image sensor pixels 11 and a controllable deformable material portion 12. The image sensor performs image capturing by using the image sensor pixels 11, the multiple image sensor pixels 11 are distributed in an array, and the controllable deformable material portion 12 is separately connected to the multiple image sensor pixels 11; and the controllable deformable material portion 12 may produce deformation under the action of an external field, and density distribution of the multiple image sensor pixels 11 is adjusted correspondingly by means of the deformation of the controllable deformable material portion 12.

In the technical solution provided in this embodiment of the present application, the controllable deformable material portion can produce deformation by changing an external field effect factor on the controllable deformable material portion, when the certain external field effect factor is cancelled or changed, the deformation of the controllable deformable material portion can be restored, and a corresponding control external field acting thereon may be selected as the external field with respect to deformation characteristics of the controllable deformable material portion, for example, the external field comprises, but is not limited to, an external electric field, a magnetic field, a light field and the like. The image sensor pixels may comprise, but are not limited to, at least one photoelectric conversion unit. Each of the image sensor pixels and the controllable deformable material portion may be closely connected in a manner which comprises, but is not limited to, adhesion, in this way, when the controllable deformable material portion produces deformation, spacing between the image sensor pixels will be adjusted correspondingly, thereby changing density distribution of the image sensor pixels and achieving the effect of giving differentiated pixel density distribution to different regions of the image sensor according to actual requirements.

During actual applications, an unevenly distributed external field can act on different regions of the controllable deformable material portion, to cause different regions of the controllable deformable material portion to produce deformation differently, thereby adjusting the overall density distribution of the image sensor pixels. Optionally, the external field can act on a region where the controllable deformable material portion and the multiple image sensor pixels do not overlap, to cause a region where the controllable deformable material portion and the image sensor pixels overlap not to produce deformation, the density distribution of the image sensor pixels is changed through deformation of other parts of the controllable deformable material portion, and the solution helps avoid damage to the image sensor pixels caused by deformation of the controllable deformable material portion.

During actual applications, at least one suitable controllable deformable material can be selected as required to prepare the controllable deformable material portion, to cause the controllable deformable material portion to have characteristics of being deformable and having recoverable deformation. Optionally, the controllable deformable material portion is prepared from at least one or more of the following controllable deformable materials: a piezoelectric material, an electroactive polymer, a photostrictive material and a magnetostrictive material.

The piezoelectric material may produce mechanical deformation due to the action of an electric field. A controllable deformable material portion prepared by using the piezoelectric material is hereinafter referred to as a piezoelectric material portion. By use of such a physical property of the piezoelectric material, this embodiment of the present application can determine electric field control information configured to make the piezoelectric material portion produce corresponding mechanical deformation according to, but not limited to, the target pixel density distribution information, control an electric field acting on the piezoelectric material portion according to the electric field control information, to cause the piezoelectric material portion to produce corresponding mechanical deformation, and correspondingly adjust the pixel density distribution of the image sensor by means of the mechanical deformation of the piezoelectric material portion, thereby achieving the purpose of adjusting pixel density distribution of the image sensor according to the target pixel density distribution information. The piezoelectric material may comprise, but is not limited to, at least one of the following: piezoelectric ceramic and piezoelectric crystal. The solution can make full use of the physical property of the piezoelectric material to adjust pixel density distribution of the image sensor.

The electroactive polymer (referred to as EAPs) is a polymer material that can change their shapes or sizes under the action of an electric field. The controllable deformable material portion prepared from the EAPs is hereinafter referred to as an EAP portion. By use of such a physical property of the EAPs, this embodiment of the present application can determine electric field control information configured to make the EAP portion produce corresponding deformation according to, but not limited to, the target pixel density distribution information, control an electric field acting on an EAP layer according to the electric field control information, to cause the EAP layer to produce corresponding deformation, and correspondingly adjust the pixel density distribution of the image sensor by means of the deformation of the EAP layer, thereby achieving the purpose of adjusting pixel density distribution of the image sensor according to the target pixel density distribution information. The EAP materials may comprise, but are not limited to, at least one of the following: electronic EAPs and ionic EAPs; the electronic EAPs comprise at least one of the following: ferroelectric polymers (such as polyvinylidene fluoride), electrostrictive grafted elastomers and liquid crystal elastomers; and the ionic EAPs comprise at least one of the following: electrorheological fluids, ionic polymer-metallic composite materials and the like. The solution can make full use of the physical property of the EAPs to adjust pixel density distribution of the image sensor.

The photostrictive material is a polymer material that can change their shapes or sizes under the action of a light field. The controllable deformable material portion prepared from the photostrictive material is hereinafter referred to as a photostrictive material portion. By use of such a physical property of the photostrictive material, this embodiment of the present application can determine light field control information configured to make the photostrictive material portion produce corresponding deformation according to, but not limited to, the target pixel density distribution information, control a light field acting on the photostrictive material portion according to the light field control information, to cause the photostrictive material portion to produce corresponding deformation, and correspondingly adjust the pixel density distribution of the image sensor by means of the deformation of the photostrictive material portion, thereby achieving the purpose of adjusting pixel density distribution of the image sensor according to the target pixel density distribution information. The photostrictive material may comprise, but is not limited to, at least one of the following: photostrictive ferroelectric ceramics and photostrictive polymers; the photostrictive ferroelectric ceramics comprise, but are not limited to, lead lanthanum zirconate titanate (PLZT) ceramics, and the photostrictive polymers comprise, but are not limited to, photostrictive liquid crystal elastomers. The solution can make full use of the physical property of the photostrictive material to adjust pixel density distribution of the image sensor.

The magnetostrictive material is a magnetic material that can change a magnetization state thereof under the action of a magnetic field and then change their sizes. The controllable deformable material portion prepared from the magnetostrictive material is hereinafter referred to as a magnetostrictive material portion. By use of such a physical property of the magnetostrictive material, this embodiment of the present application can determine magnetic field control information configured to make the magnetostrictive material produce corresponding deformation according to, but not limited to, the target pixel density distribution information, control a magnetic field acting on the magnetostrictive material portion according to the magnetic field control information, to cause the magnetostrictive material portion to produce corresponding deformation, and correspondingly adjust the pixel density distribution of the image sensor by means of the deformation of the magnetostrictive material portion, thereby achieving the purpose of adjusting pixel density distribution of the image sensor according to the target pixel density distribution information. The magnetostrictive material may comprise, but is not limited to, rare-earth giant magnetostrictive materials, such as alloy $Tbo_{0.3}Dy_{0.7}Fe_{1.95}$ materials using a (Tb,Dy)$Fe_2$ compound as a substrate. The solution can make full use of the physical property of the magnetostrictive material to adjust pixel density distribution of the image sensor.

In the technical solution provided in this embodiment of this application, a specific structure and a connection manner of the image sensor pixels and the controllable deformable material portion may be determined according to an actual need, and an actual manner is very flexible.

In an optional implementation, as shown in FIG. 2b, the controllable deformable material portion 12 comprises a controllable deformable material layer 121. The multiple image sensor pixels 11 are distributed in an array and connected to one side of the controllable deformable material layer 121. Optionally, it is feasible to choose to directly form the multiple image sensor pixels on the controllable deformable material portion 12 according to actual process conditions, or the multiple image sensor pixels and the controllable deformable material portion 12 can be prepared respectively and can be closely connected in a manner which comprises, but is not limited to, adhesion. The solution has a simple structure and is easy to achieve.

Figure 2C:
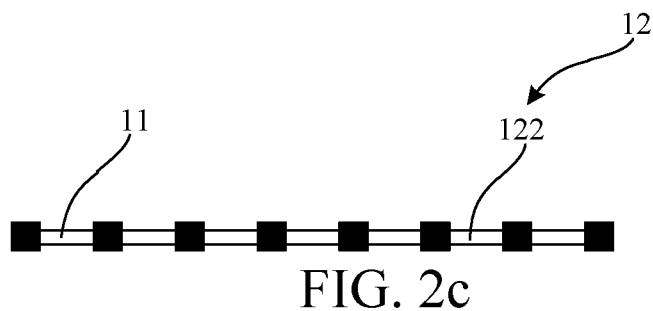
FIG. 2c is a schematic structural diagram of a second image sensor with adjustable pixel density, according to an embodiment of the present application.

In another optional implementation, as shown in FIG. 2c, the controllable deformable material portion 12 comprises multiple controllable deformable material connection sub-portions 122. The multiple controllable deformable material connection sub-portions 122 are distributed in an array, so as to correspondingly connect the multiple image sensor pixels 11 distributed in an array, that is, the multiple image sensor pixels distributed in an array are connected into one piece by using the multiple controllable deformable material connection sub-portions distributed in an array. Optionally, the multiple controllable deformable material connecting sub-portions may be formed in space regions of pixels of an image sensor pixel array according to an actual process, and the multiple controllable deformable material connecting sub-portions and the corresponding image sensor pixels may be connected in a manner which comprises, but is not limited to, abutment and adhesion. Density distribution of the image sensor pixels may be adjusted by controlling deformation of the multiple controllable deformable material connection sub-portions. The structure is simple and easy to implement.

Figure 2D:
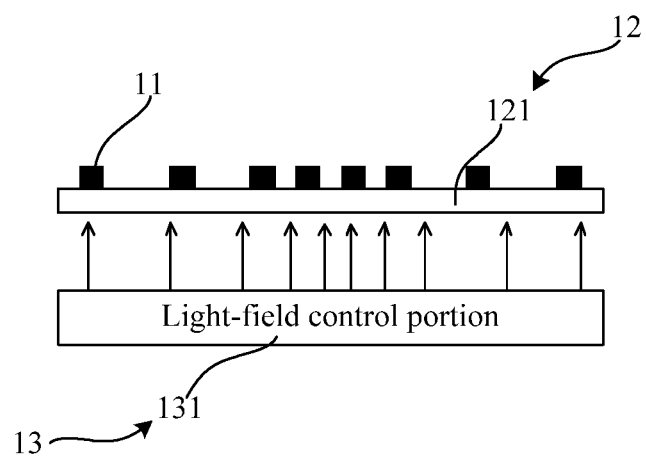
FIG. 2d is a schematic structural diagram of a third image sensor with adjustable pixel density, according to an embodiment of the present application.
Figure 2E:
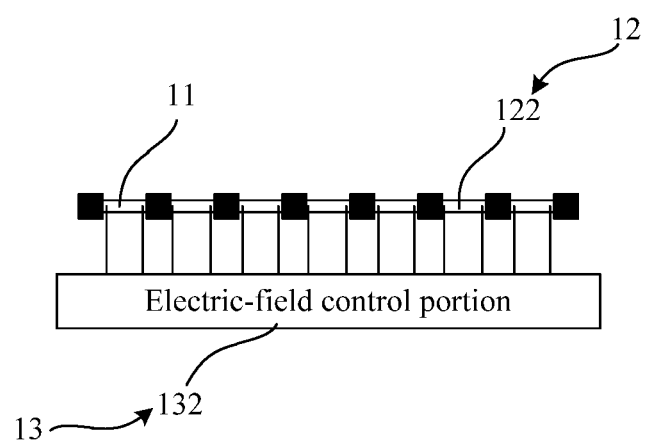
FIG. 2e is a schematic structural diagram of a fourth image sensor with adjustable pixel density according to an embodiment of the present application.

Further, as shown in FIGS. 2d and 2e, the image sensor may further comprise a deformation control portion 13. The deformation control portion 13 is configured to adjust distribution of the external field acting on the controllable deformable material portion 12, so as to control the controllable deformable material portion 12 to produce corresponding deformation. In this way, when the controllable deformable material portion 12 produces deformation, spacing between the image sensor pixels 11 is adjusted correspondingly, thereby changing density distribution of the image sensor pixels 11, and achieving an effect of giving differentiated pixel point distribution to different regions of the image sensor according to actual requirements.

Optionally, as shown in FIG. 2d, the deformation control portion may comprise a light-field control portion 131. The light-field control portion 131 is configured to adjust distribution of an external light field acting on the controllable deformable material portion 12, so as to control the controllable deformable material portion 12 to produce corresponding deformation. In this way, the controllable deformable material portion 12 may comprise a photostrictive material portion at least prepared from a photostrictive material, for example, the photostrictive material portion may comprise a photostrictive material layer at least prepared from the photostrictive material, or the controllable deformable material portion may comprise multiple photostrictive material connecting sub-portions at least prepared from the photostrictive material. The light-field control portion 131 excites different regions of the controllable deformable material portion 12 to produce deformation differently by changing light field distribution acting on the photostrictive material portion (in FIG. 2d, the light field with different intensity distribution acting on the controllable deformable material portion 12 is represented through arrow density), and the spacing between the image sensor pixels 11 is adjusted correspondingly by means of the deformation of the controllable deformable material portion 12, thereby changing density distribution of the image sensor pixels 11 and achieving the effect of giving differentiated pixel point distribution to different regions of the image sensor according to actual requirements.

Figure 2F:
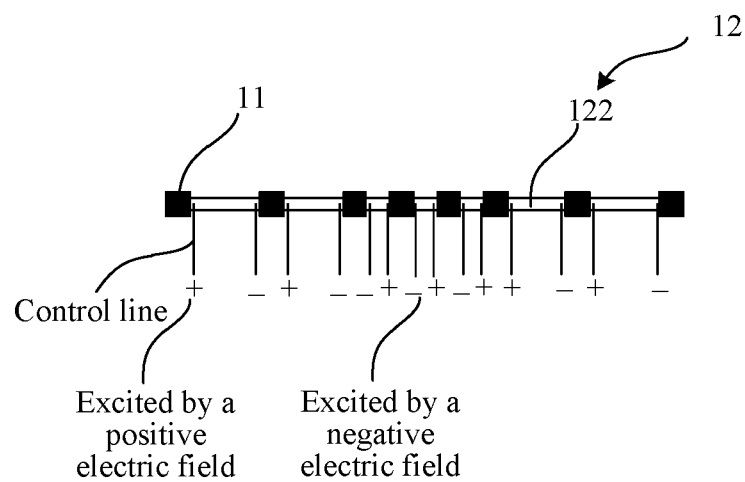
FIG. 2f is an example of a scenario in which an image sensor adjusts pixel density in the case of uneven light field excitation, according to an embodiment of the present application.

Optionally, as shown in FIG. 2e, the deformation control portion may comprise an electric-field control portion 132. The electric-field control portion 132 is configured to adjust distribution of an external electric field acting on the controllable deformable material portion, so as to control the controllable deformable material portion to produce corresponding deformation. In this case, the controllable deformable material portion 12 may comprise a piezoelectric material portion at least prepared from a piezoelectric material (such as a piezoelectric material layer or a piezoelectric material connecting sub-portion), or the controllable deformable material portion 12 may comprise an EAP portion at least prepared from EAPs (such as an EAP layer or an EAP connecting sub-portion). As shown in FIG. 2e, the electric field control portion and the controllable deformable material can be connected through a control line, and the electric field control portion 132 excites different regions of the controllable deformable material portion 12 to produce deformation differently by changing electric field distribution acting on the controllable deformable material portion. If the electric field acting on the controllable deformable material portion 12 is a zero field, the controllable deformable material portion does not produce deformation (might as well be called zero field excitation); if intensity distribution of the electric field acting on the controllable deformable material portion 12 (for example, "+" excited by a positive electric field and "−" excited by a negative electric field shown in FIG. 2e) is changed to cause the intensity of the electric field acting on different regions of the controllable deformable material portion 12 to vary, as shown in FIG. 2f, in this way, the different regions of the controllable deformable material portion 12 may produce deformation differently, and the spacing between the image sensor pixels 11 is adjusted correspondingly by means of the deformation of the controllable deformable material portion 12, thereby changing the overall pixel density distribution of the image sensor and achieving the effect of giving differentiated pixel density distribution to different regions of the image sensor according to actual requirements.

In this embodiment of the present application, the controllable deformed portion and the deformation control portion may be directly connected, and may also be indirectly connected. The deformation control portion may be as a part of the image sensor, or the deformation control portion may also not be a part of the image sensor, and the image sensor may also be connected to the deformation control portion through a reserved pin or interface or the like. The external field acting on the controllable deformable material portion may comprise, but is not limited to, an electric field, a magnetic field, a light field and the like. A hardware or software structure configured to produce the electric field, a hardware or software structure configured to produce the magnetic field, a hardware or software structure configured to produce the light field and the like can be achieved by using corresponding existing technologies according to actual requirements, which is no longer repeated herein in this embodiment of the present application.

Figure 2G:
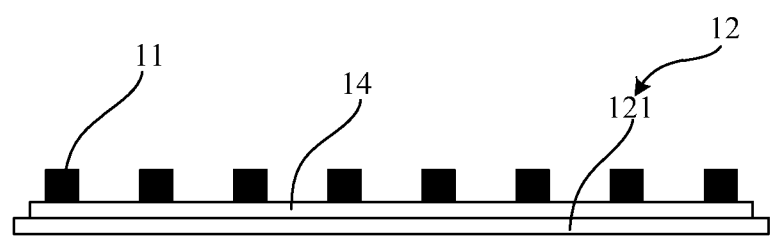
FIG. 2g is a schematic structural diagram of a fifth image sensor with adjustable pixel density, according to an embodiment of the present application.
Figure 2H:
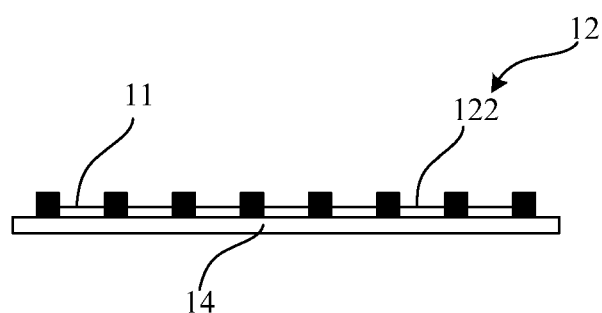
FIG. 2h is a schematic structural diagram of a sixth image sensor with adjustable pixel density, according to an embodiment of the present application.

Optionally, the image sensor may further comprise a flexible substrate. The flexible substrate may comprise, but is not limited to, a plastic flexible substrate, which has certain flexibility and can change the shape of the flexible substrate according to requirements. The image sensor pixels and the controllable deformable material portion may be disposed at the same side or different sides of the flexible substrate. For example, as shown in FIG. 2g, the multiple image sensor pixels 11 are connected to one side of a flexible substrate 14, and the controllable deformable material portion (for example, the controllable deformable material layer 121) is connected to the other side of the flexible substrate 14. For example, as shown in FIG. 2h, the multiple image sensor pixels 11 are connected to one side of the flexible substrate 14, and the controllable deformable material portion (for example, the controllable deformable material connection sub-portions 122) is connected to a corresponding image sensor pixel and is located at the same side of the flexible substrate 14 with the image sensor pixels 11. The solution not only can indirectly adjust the overall pixel density distribution of the image sensor by controlling its deformation through the external field acting on the controllable deformable material portion, to achieve adjustable pixel density of the image sensor, but also can flexibly change the shape of the image sensor due to use of the flexible substrate, for example, a plane image sensor is bent to a particular angle to obtain a surface image sensor, thereby meeting application demands such as diversified image capturing and decoration.

Figure 2I:
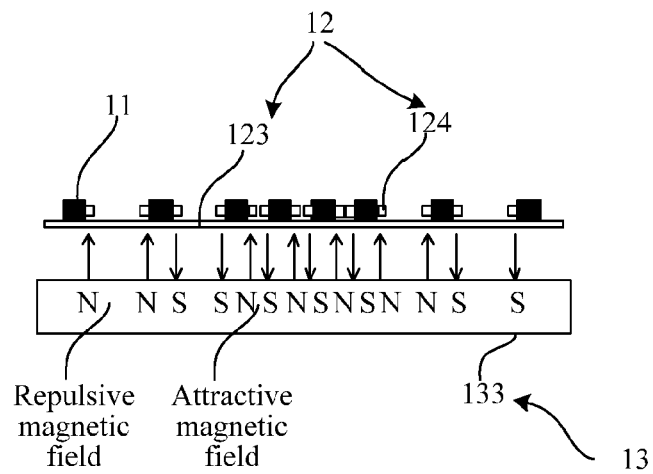
FIG. 2i is a schematic structural diagram of a seventh image sensor with adjustable pixel density, according to an embodiment of the present application.

FIG. 2i is a schematic structural diagram of a seventh image sensor with adjustable pixel density according to an embodiment of the present application. In the image sensor as shown in FIG. 2i, the controllable deformable material portion 12 comprises a flexible substrate 123 and multiple permeability magnetic material portions 124; the multiple image sensor pixels 11 are respectively connected to the flexible substrate 123, at least a part of the image sensor pixels 11 are connected to the multiple permeability magnetic material portions 124, the flexible substrate 123 produces corresponding deformation by changing a magnetic field acting on the permeability magnetic material portions 124, and density distribution of the multiple image sensor pixels 11 is correspondingly adjusted through the deformation. For example, a permeability magnetic material portion 124 can be disposed on a side face of each image sensor pixel, and optionally, the image sensor pixel 11 is respectively adhered to the flexible substrate 123 and the permeability magnetic material portion 124. The permeability magnetic material portion may comprise a magnetic pole prepared from a permeability magnetic material, and the permeability magnetic material may comprise, but is not limited to, one or more of a soft magnetic material, a silicon steel sheet, a permalloy, ferrite, an amorphous soft magnetic alloy, and a super-microcrystalline soft magnetic alloy. The permeability magnetic material portion prepared from the soft magnetic material has better permeability, and small residual magnetization after cancellation of the magnetic field facilitates next adjustment.

Further, optionally, the deformation control portion 13 in this embodiment of the present application may further comprise a magnetic field control portion 133. The magnetic field control portion 133 is configured to adjust distribution of an external magnetic field acting on the controllable deformable material portion, so as to control the controllable deformable material portion to produce corresponding deformation. For example, when the magnetic field control portion 133 controls the magnetic field (that is, excitation magnetic field) acting on the permeability magnetic material portion 124, as shown in FIG. 2i, a like magnetic pole (NN or SS) repulsion magnetic field or an unlike magnetic pole (NS or SN) attraction magnetic field with certain magnetic field strength distribution is applied between adjacent image sensor pixels, the poles may produce a corresponding repelling force or attracting force therebetween, and the magnetic force is transferred to the flexible substrate 123 to make the flexible substrate 123 produce deformation such as expansion and contraction, thereby changing the spacing between the corresponding image sensor pixels and achieving the purpose of adjusting pixel density distribution of the image sensor. The solution achieves adjustable pixel density distribution of the image sensor in combination with scalable deformation characteristics of the flexible substrate and the magnetic field control principle.

Figure 2J:
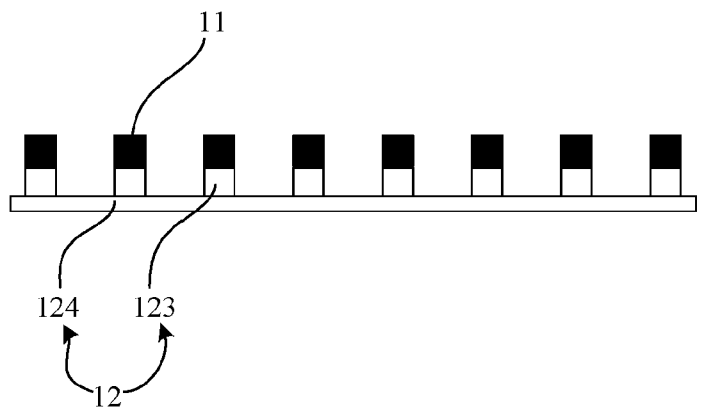
FIG. 2j is a schematic structural diagram of an eighth image sensor with adjustable pixel density, according to an embodiment of the present application.

FIG. 2j is a schematic structural diagram of an eighth image sensor with adjustable pixel density according to an embodiment of the present application. In the image sensor as shown in FIG. 2j, the controllable deformable material portion 12 comprises a flexible substrate 123 and multiple permeability magnetic material portions 124; one side of the multiple permeability magnetic material portions 124 is respectively connected to the flexible substrate 123, an opposite face of the multiple permeability magnetic material portions 124 is respectively connected to the multiple image sensor pixels 11 correspondingly, the flexible substrate 123 produces corresponding deformation by changing a magnetic field acting on the permeability magnetic material portions 124, and density distribution of the multiple image sensor pixels 11 is correspondingly adjusted through the deformation. Optionally, the permeability magnetic material portions 124 are adhered to the flexible substrate 123, the image sensor pixels 11 are adhered to the permeability magnetic material portions 124, and when the magnetic field acting on the permeability magnetic material portions 124 changes, the magnetic force is transferred to the flexible substrate 123 to make the flexible substrate 123 produce deformation such as expansion and contraction, thereby achieving the purpose of adjusting pixel density distribution of the image sensor. The solution achieves adjustable pixel density distribution of the image sensor in combination with scalable deformation characteristics of the flexible substrate and the magnetic field control principle.

After pixel density distribution of the image sensor is adjusted according to the target pixel density distribution information, image capturing of the image is performed. During the image capturing, image sensor pixels of the image sensor all take part in the image capturing, but pixel density of different regions may be different, to cause a part, which corresponds to a region with the larger image sensor pixel density, of the captured image to be relatively high in image definition and relatively rich in details. However, a part, which corresponds to a region with the smaller image sensor pixel density, of the captured image is relatively low in image definition and relatively insufficient in details. An overall volume of the captured image is nearly as large as a volume of a same-size image captured by the image sensor without adjusting pixel density distribution. In this way, definition of different regions of a same captured image is presented in a differentiated manner, which helps improve the image capturing efficiency, and is convenient to present an image intuitively.

To further reduce burden of image resource storage and/or bandwidth resource transmission, compression processing may be performed on the image (which might as well be referred to as "an originally captured image") that is captured based on the technical solution provided in this embodiment of the present application, to reduce a volume of the image. For example, down-sampling processing is performed on the captured image according to a down-sampling rate; and in this way, a volume of the image may be reduced and although down-sampling processing is performed on parts originally captured by regions (these regions are usually relatively important or significant for a user), which have large pixel density, of the image sensor, loss of definition of images thereof is relatively small, thereby helping improve image presentation efficiencies of the parts and visual experience of a user. In addition, if it is required to perform enlarged processing on the originally captured image, a part, which is captured by a region, which has a large pixel density, of an image sensor, of an image is relatively high in image definition and rich in image details. Therefore, the part may support image processing with a larger enlarged rate, that is, it is very convenient and flexible to perform post-processing on the originally captured image, which helps relieve burden of image storage and/or bandwidth transmission, and may better meet diversified application demands of users.

According to this embodiment of the present application, after an image is captured by the image sensor adjusted according to the pixel density distribution, the captured image may be scanned and output, for example, pixel index information of the image sensor may be acquired; and according to the pixel index information, the captured image is scanned and output. The pixel index information of the image sensor comprises original position information of each image sensor pixel before the pixel density distribution of the image sensor is adjusted. By using a particular scanning manner (scanning line by line, scanning column by column, scanning every other line, or the like), the image is scanned and output according to the pixel index information. During image capturing of the image sensor, there is a difference between actual position information of a pixel and index information of a corresponding pixel, and therefore, compared with the originally captured image, the image scanned and output according to the pixel index information is a deformed image displayed in an abnormal proportion. Compared with the originally captured image, in the deformed image, a size of a part corresponding to a region with large pixel density is larger than that of the part in the originally captured image, for example, a head image part is acquired based on a region, which has a larger pixel density, of the image sensor, and in this case, in the deformed image obtained by scanning and outputting, the head image part is larger than the head image part in the originally captured image. In this way, it may be more convenient for a user to view a part that needs to be focused on, and an image presentation efficiency and visual experience of a user are improved.

If it is required to obtain a non-deformed image, which remains a display proportion compared with the originally captured image, restoration processing may be performed on the scanned and output deformed image according to the target pixel density distribution information, to obtain a restored image that has a normal display proportion and corresponds to the originally captured image.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

In the light-communication receiving method provided in this embodiment of the present application, emphasis is put on description from a receiver end side. For description related to other aspects such as interaction between the transmit end and the receiver end, and a transmit end side, reference may be made to the disclosure of other parts of the embodiments of the present application.

Figure 3:
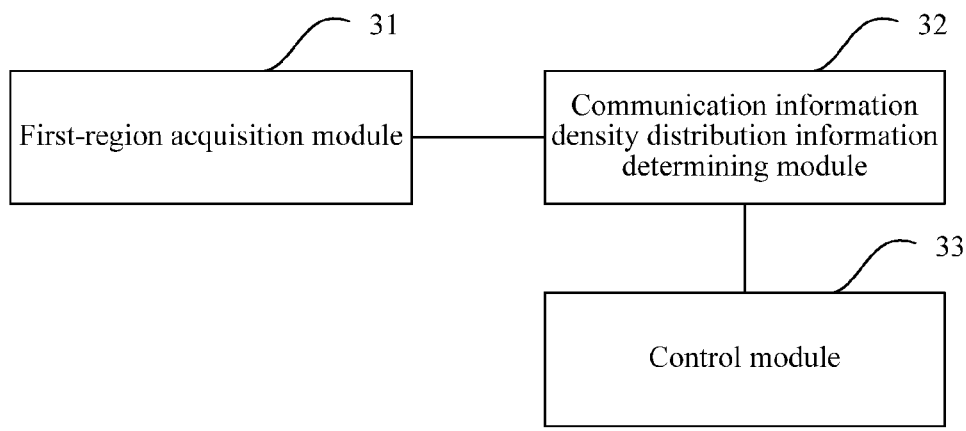
FIG. 3 is a logical block diagram of a first light-communication sending apparatus, according to an embodiment of the present application.

FIG. 3 is a logical block diagram of a first light-communication sending apparatus according to an embodiment of the present application. As shown in FIG. 3, the light-communication sending apparatus comprises a first-region acquisition module 31, a communication information density distribution information determining module 32, and a control module 33.

The first-region acquisition module 31 is configured to acquire a first region of an image.

The communication information density distribution information determining module 32 is configured to determine, according to the first region, information about density distribution of communication information that is to be modulated to light emitted by a light source.

The control module 33 is configured to control the light source to display the image, and during displaying of the image, modulate, according to the information about the density distribution of the communication information, the communication information to the light emitted by the light source.

The light-communication sending apparatus has an image display function, and can control sending of communication information during displaying of the image by performing the light-communication sending method in an application process, which may be, but is not limited to displaying a static or dynamic image, and a video. A device presentation form of the light-communication sending method is not limited, for example, the light-communication sending method may be a separate component, and the component cooperates and communicates with a display device comprising a light source and an image display function. The display device may comprise, but is not limited to an indoor or outdoor device of a display screen having a light source, and a fixed or movable device of a display screen having a light source; or, the light-communication sending method may be integrated into a display device as a functional module, which is not limited in this embodiment of the present application.

According to the technical solution provided in this embodiment of the present application, according to a first region of an image, a transmit end determines density distribution of communication information that is to be modulated to light emitted by a light source, to cause the determined density distribution of the communication information to match the foregoing division of the image; during displaying of the image, according to information about the density distribution of the communication information, the communication information is modulated to the light emitted by the light source, to cause density of the communication information, which is modulated to the light corresponding to different regions of the image and emitted by the light source, to be different during displaying of the image, so that the quantities of actually modulated communication data, which correspond to the different regions of the image, are distributed in a differentiated manner; and a receiver end may acquire, in a differentiated manner, communication information that has different density and is configured to present different regions of the image during capturing of the image, thereby better meeting diversified actual application demands of users.

Optionally, in the information about the density distribution of the communication information, communication information density corresponding to light, which is used to display the first region, of the light source is different from communication information density corresponding to light, which is used to display a second region, of the light source, where the second region comprises at least a part of a region of the image except the first region.

Optionally, communication information that is modulated to the corresponding light, which is used to display the first region, of the light source is related to image content of the first region.

Figure 4:
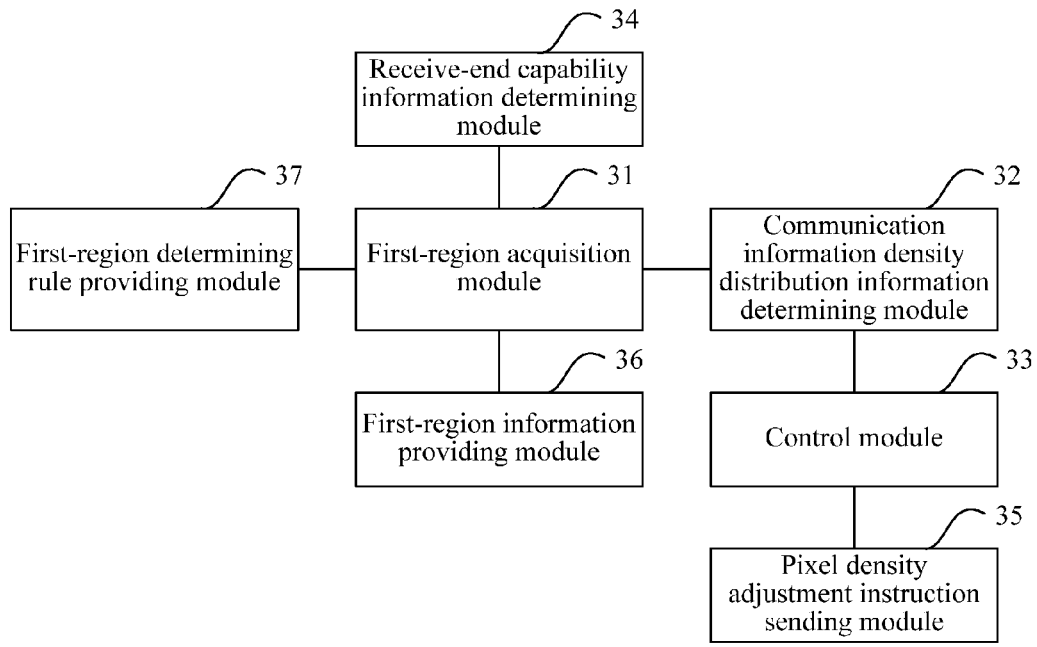
FIG. 4 is a logical block diagram of a second light-communication sending apparatus, according to an embodiment of the present application.

Optionally, as shown in FIG. 4, the light-communication sending apparatus further comprises a receive-end capability information determining module 34. The receive-end capability information determining module 34 is configured to determine that pixel density of an image sensor of a receiver end is adjustable. The solution helps reduce a possibility of occurrence of a receiving error of a receiver end and improves universality of this embodiment of the present application.

Optionally, the light-communication sending apparatus further comprises a pixel density adjustment instruction sending module 35. The pixel density adjustment instruction sending module 35 is configured to instruct the receiver end to adjust the pixel density of the image sensor according to the first region, so that in the adjusted image sensor, pixel density of an imaging region corresponding to the first region is different from pixel density of an imaging region corresponding to the second region. According to the solution, the transmit end initiates an instruction that the receiver end adjusts pixel density, to cause a communication information modulation manner of the transmit end to adapt to a receiving capability of the image sensor of the receiver end, so as to reduce a possibility of occurrence of a receiving error.

Optionally, the light-communication sending apparatus further comprises a first-region information providing module 36. The first-region information providing module 36 is configured to provide information of the first region. According to the solution, by providing information of the first region by the transmit end, it helps ensure that information of the first region according to which pixel density of an image sensor is adjusted by a receiver end is the same as information of the first region according to which communication information density differentiation modulation is performed by a transmit end as much as possible.

Optionally, the light-communication sending apparatus further comprises a first-region determining rule providing module 37. The first-region determining rule providing module 37 is configured to provide a determining rule for the first region. According to the solution, by providing a determining rule for the first region by the transmit end, it helps ensure that information of the first region according to which pixel density of an image sensor is adjusted by a receiver end is the same as the first region according to which communication information density differentiation modulation is performed by a transmit end as much as possible.

Figure 5:
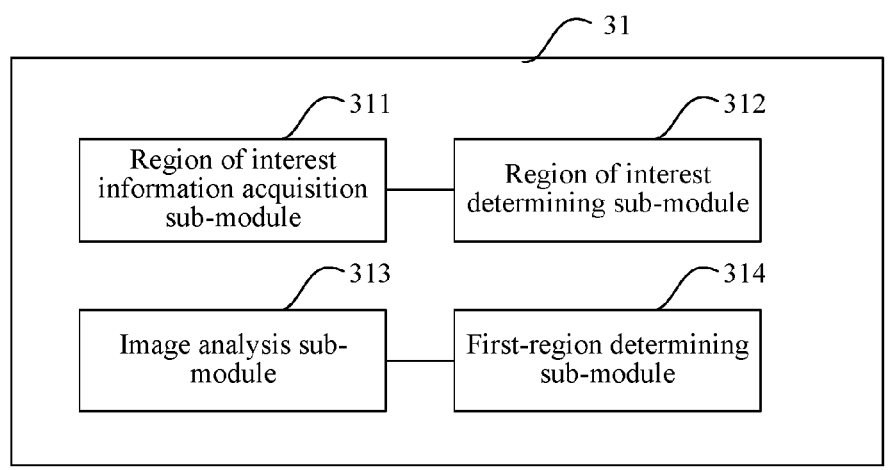
FIG. 5 is an optional logical block diagram of a first-region acquisition module, according to an embodiment of the present application.

Optionally, as shown in FIG. 5, the first-region acquisition module 31 comprises an ROI information acquisition sub-module 311 and an ROI determining sub-module 312. The ROI information acquisition sub-module 311 is configured to acquire information of an ROI; and the ROI determining sub-module 312 is configured to determine the first region of the image according to the information of the ROI. The solution causes determining of the first region to match a user's actual requirement more, and may better meet personalized application demands of users.

Optionally, the first-region acquisition module 31 comprises an image analysis sub-module 313 and a first-region determining sub-module 314. The image analysis sub-module 313 is configured to perform an image analysis on the image; and the first-region determining sub-module 314 is configured to determine the first region of the image according to a result of the image analysis. The solution causes determining of the first region to be more intelligent, and improves an efficiency and universality of determining of the first region.

Figure 6:
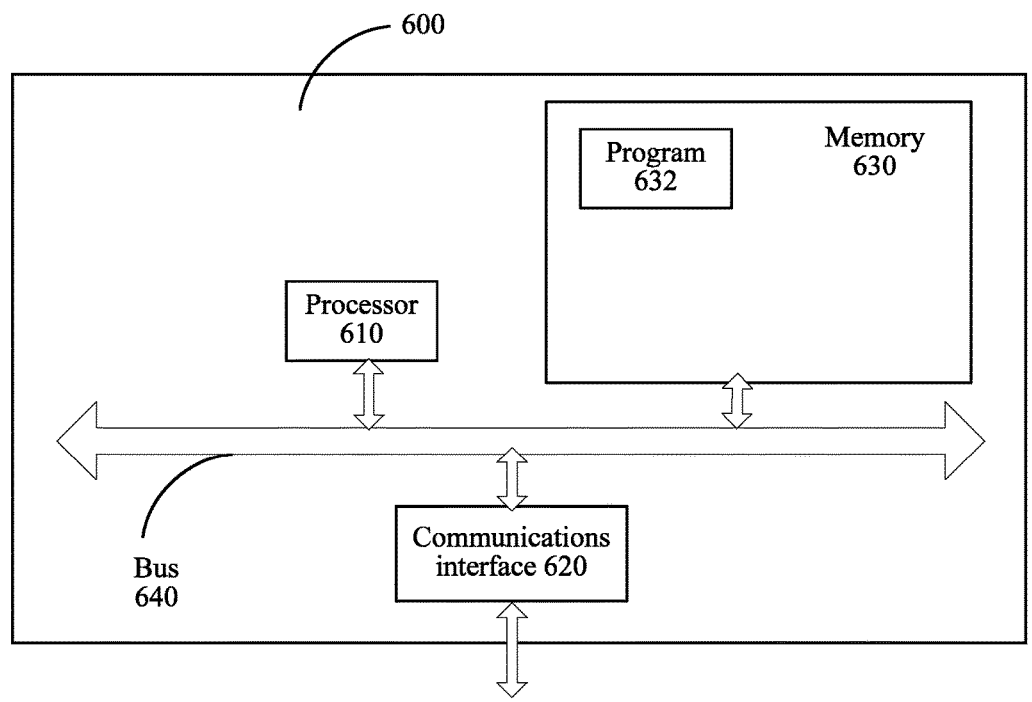
FIG. 6 is a logical block diagram of a third light-communication sending apparatus, according to an embodiment of the present application.

FIG. 6 is a structural block diagram of a third light-communication sending apparatus according to an embodiment of the present application. A specific implementation of a light-communication sending apparatus 600 is not limited in a specific embodiment of the present application. As shown in FIG. 6, the light-communication sending apparatus 600 may comprise:

a processor 610, a communications interface 620, a memory 630, and a communications bus 640.

The processor 610, the communications interface 620, and the memory 630 communicate with each other through the communications bus 640.

The communications interface 620 is configured to communicate with a device having a communications function, an external light source, or the like.

The processor 610 is configured to execute a program 632, and specifically, may execute a related step in any one of the foregoing embodiments of the image capturing control method.

For example, the program 632 may comprise a program code. The program code comprises a computer operation instruction.

The processor 610 may be a central processing unit (CPU) or an application specific integrated circuit (ASIC), or may be configured as one or more integrated circuits that implement the embodiments of the present application.

The memory 630 is configured to store the program 632. The memory 630 may comprise a random access memory (RAM), and may also comprise a non-volatile memory, for example, at least one magnetic disk storage.

For example, in an optional implementation manner, the processor 610 may perform the following steps by executing the program 632: a first region of an image is captured; according to the first region, information about density distribution of communication information that is to be modulated to light emitted by a light source is determined; and the light source is controlled to display the image, and during displaying of the image, according to the information about the density distribution of the communication information, the communication information is modulated to the light emitted by the light source.

In another optional implementation, the processor 610 may also execute a step referred in any one of the foregoing other embodiments by executing the program 632, which is not repeated herein.

Reference can be made to corresponding description in the corresponding steps, modules, sub-modules and units in the embodiments of the foregoing light-communication sending method for specific implementation of the steps in the program 632, which is not repeated herein. Those skilled in the art can clearly understand that, reference can be made to the corresponding process description in the method embodiments for the devices described above and the specific working procedures of the modules, and will not be repeated herein in order to make the description convenient and concise.

Figure 7:
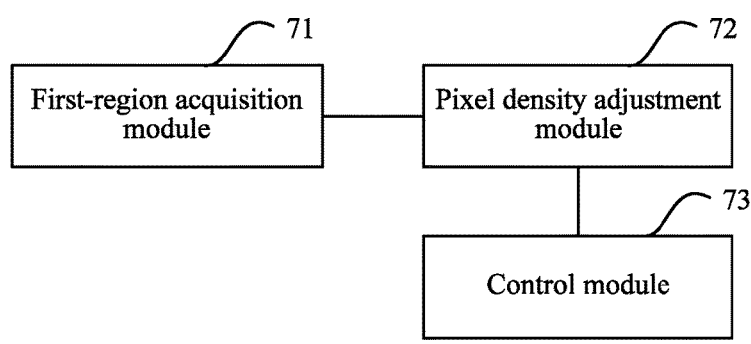
FIG. 7 is a logical block diagram of a first light-communication receiving apparatus, according to an embodiment of the present application.

FIG. 7 is a logical block diagram of a first light-communication receiving apparatus according to an embodiment of the present application. As shown in FIG. 7, the light-communication receiving apparatus comprises a first-region acquisition module 71, a pixel density adjustment module 72, and a control module 73.

The first-region acquisition module 71 is configured to acquire a first region of an image.

The pixel density adjustment module 72 is configured to adjust pixel density distribution of an image sensor according to the first region.

The control module 73 is configured to capture the image by using the adjusted image sensor, and during capturing of the image, receive communication information modulated by a transmit end to light emitted by a light source that displays the image.

The light-communication receiving apparatus may perform static or dynamic image, or video capturing control by executing the light-communication receiving method in an application process, which may be, but is not limited to, photographing, camera shooting, photographing and video monitoring. A device presentation form of the light-communication receiving apparatus is not limited, for example, the light-communication receiving apparatus may be a separate part, and the part cooperates and communicates with an image capturing device comprising an image sensor; or, the light-communication receiving apparatus may be integrated into an image capturing device that comprises an image sensor as a functional module, which is not limited in this embodiment of the present application.

According to the technical solution provided in this embodiment of the present application, during image capturing of a receiver end, all pixels of the image sensor all take part in receiving of an optical signal, that is, take part in image capturing and receiving of communication information. Because the pixel density distribution of the image sensor has been adjusted according to the first region of the image, if the image is captured according to the adjusted image sensor, definition of different regions of the captured image and density of received communication information that is modulated to the light emitted by the light source of the transmit end are distributed in a differentiated manner, which is corresponding to differentiated distribution of actual pixel density of the image sensor. In this way, on one hand, an effect of giving different pixel density to different imaging regions for image capturing may be achieved, to cause definition of different regions of the captured image to be different, and to further help improve the image capturing efficiency without increasing a size of the image; on the other hand, a corresponding receiving capability may also be used to receive communication information, to improve the receiving efficiency of communication information.

Optionally, in the adjusted image sensor, pixel density of an imaging region corresponding to the first region is different from pixel density of an imaging region corresponding to a second region, where the second region comprises at least a part of a region of the image except the first region.

Optionally, density of communication information received by an imaging region corresponding to the first region is different from density of communication information received by an imaging region corresponding to the second region.

Optionally, communication information received by an imaging region corresponding to the first region is related to image content captured by an imaging region corresponding to the first region.

Figure 8:
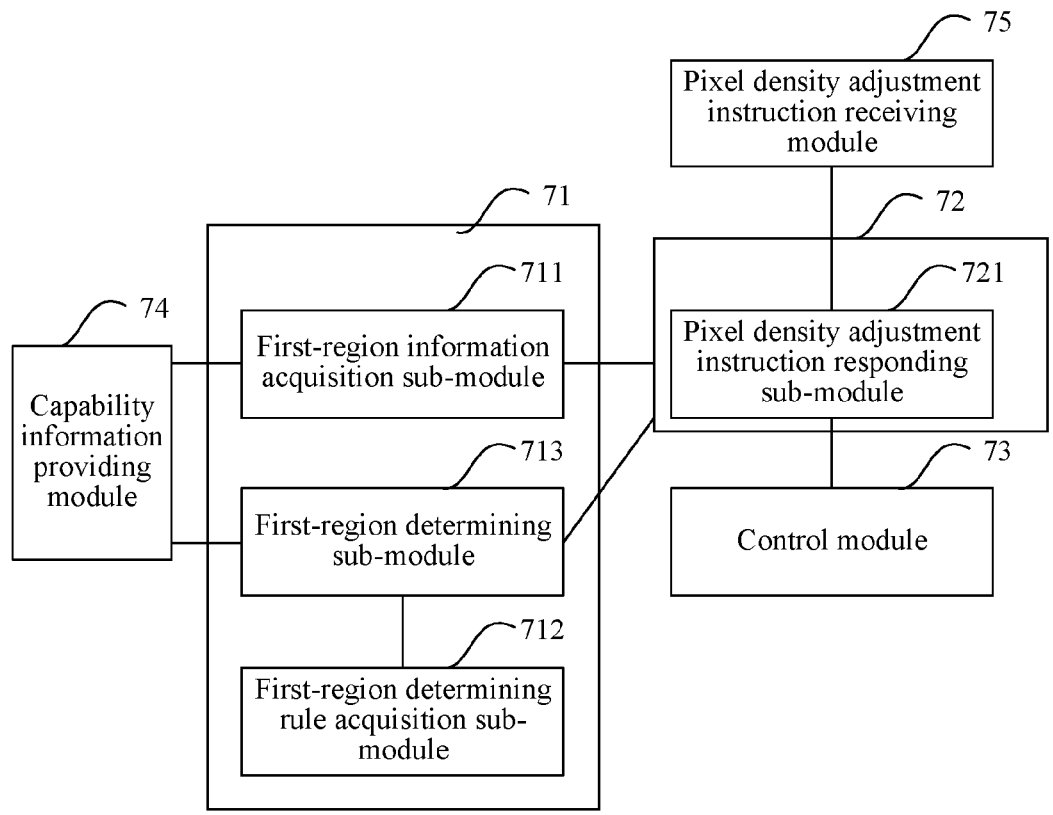
FIG. 8 is a logical block diagram of a second light-communication receiving apparatus, according to an embodiment of the present application.

Optionally, as shown in FIG. 8, the light-communication receiving apparatus further comprises a capability information providing module 74. The capability information providing module 74 is configured to provide capability information indicating that the image sensor has adjustable pixel density. According to the solution, the receiver end provides capability information whether pixel density of the image sensor thereof is adjustable, to cause the transmit end to perform communication information density differentiation modulation correspondingly, thereby improving the transmission efficiency of communication information.

Optionally, the light-communication receiving apparatus further comprises a pixel density adjustment instruction receiving module 75, and the pixel density adjustment instruction receiving module 75 is configured to receive a pixel density adjustment instruction. In this case, the pixel density adjustment module 72 comprises a pixel density adjustment instruction responding sub-module 721, which is configured to adjust, in response to the pixel density adjustment instruction, pixel density of the image sensor according to the first region of the image. According to the solution, the receiver end responds to the instruction to adjust the pixel density, which initiated by the transmit end, which helps a communication information modulation manner of the transmit end adapt to a receiving capability of the image sensor of the receiver end, so as to reduce a possibility of occurrence of a receiving error.

Optionally, the first-region acquisition module 71 comprises: a first-region information acquisition sub-module 711, configured to acquire information of the first region from the transmit end. The solution helps ensure that information of the first region according to which pixel density of an image sensor is adjusted by the receiver end is the same as information of the first region according to which communication information density differentiation modulation is performed by the transmit end as much as possible.

Optionally, the first-region acquisition module 71 comprises a first-region determining rule acquisition sub-module 712 and a first-region determining sub-module 713. The first-region determining rule acquisition sub-module 712 is configured to acquire a determining rule for the first region;

and the first-region determining sub-module 713 is configured to determine the first region of the image according to the determining rule. The solution helps ensure that information of the first region according to which pixel density of an image sensor is adjusted by a receiver end is the same as the first region according to which communication information density differentiation modulation is performed by a transmit end as much as possible.

Figure 9:
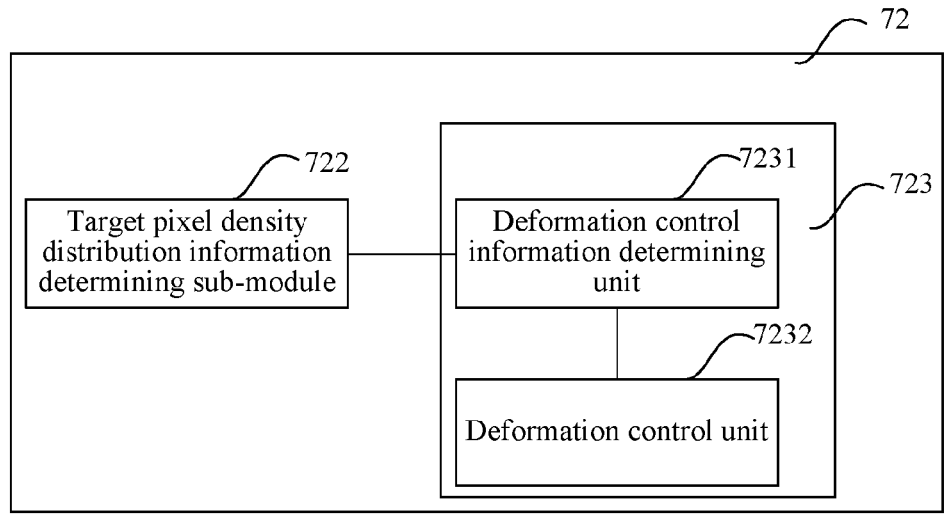
FIG. 9 is an optional logical block diagram of a pixel density adjustment module, according to an embodiment of the present application.

Optionally, as shown in FIG. 9, the pixel density adjustment module 72 comprises a target pixel density distribution information determining sub-module 722 and a pixel density distribution adjustment sub-module 723. The target pixel density distribution information determining sub-module 722 is configured to determine target pixel density distribution information of the image sensor according to the first region; and the pixel density distribution adjustment sub-module 723 is configured to adjust pixel density distribution of the image sensor according to the target pixel density distribution information. A manner of implementing the solution is very flexible, and may better meet diversified application demands of users Optionally, the pixel density distribution adjustment sub-module 723 comprises a deformation control information determining unit 7231 and a deformation control unit 7232. The deformation control information determining unit 7231 is configured to determine deformation control information of a controllable deformable material portion according to the target pixel density distribution information; and the deformation control unit 7232 is configured to control the controllable deformable material portion to produce deformation according to the deformation control information, so as to correspondingly adjust the pixel density distribution of the image sensor by means of the deformation of the controllable deformable material portion. Optionally, the controllable deformable material portion may be prepared from, but is not limited to being prepared from one or more of the following controllable deformable materials: a piezoelectric material, an electroactive polymer, a photostrictive material and a magnetostrictive material. According to the solution, pixel distribution of the image sensor is adjusted through deformation of a controllable deformable material portion. The solution is simple and easy to implement.

Figure 10:
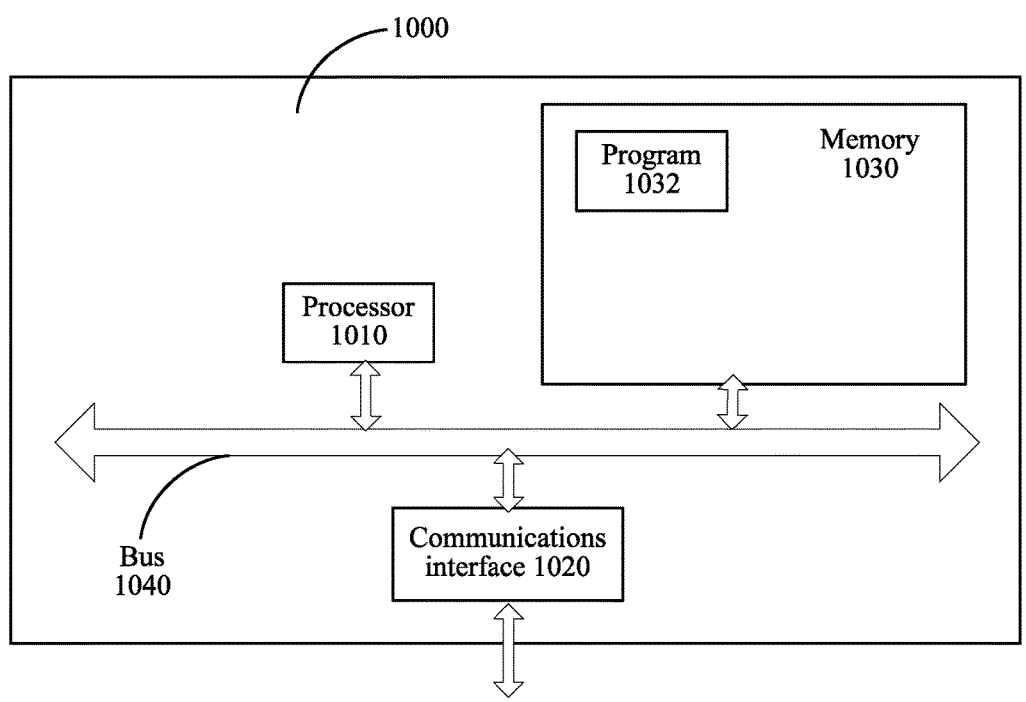
FIG. 10 is a logical block diagram of a third light-communication receiving apparatus, according to an embodiment of the present application.

FIG. 10 is a structural block diagram of a third light-communication receiving apparatus according to an embodiment of the present application. A specific implementation of a light-communication receiving apparatus 1000 is not limited in a specific embodiment of the present application. As shown in FIG. 10, the light-communication receiving apparatus 1000 may comprise:

a processor 1010, a communications interface 1020, a memory 1030, and a communications bus 1040.

The processor 1010, the communications interface 1020, and the memory 1030 communicate with each other through the communications bus 1040.

The communications interface 1020 is configured to communicate with a device having a communications function, an external light source, or the like.

The processor 1010 is configured to execute a program 1032, and specifically, may execute a related step in any one of the foregoing embodiments of the image capturing control method.

For example, the program 1032 may comprise a program code. The program code comprises a computer operation instruction.

The processor 1010 may be a central processing unit (CPU) or an application specific integrated circuit (ASIC), or may be configured as one or more integrated circuits that implement the embodiments of the present application.

The memory 1030 is configured to store the program 1032. The memory 1030 may comprise a random access memory (RAM), and may also comprise a non-volatile memory, for example, at least one magnetic disk storage.

For example, in an optional implementation manner, the processor 1010 may perform the following steps by executing the program 1032: a first region of an image is captured; pixel density distribution of an image sensor is adjusted according to the first region; and the image is captured by using the adjusted image sensor, and during capturing of the image, communication information modulated by a transmit end to light emitted by a light source that displays the image is received.

In another optional implementation, the processor 1010 may also execute a step referred in any one of the foregoing other embodiments by executing the program 1032, which is no longer repeated herein.

Reference can be made to corresponding description in the corresponding steps, modules, sub-modules and units in the embodiments of the foregoing light-communication receiving method for specific implementation of the steps in the program 1032, which is no longer repeated herein. Those skilled in the art can clearly understand that, reference can be made to the corresponding process description in the method embodiments for the devices described above and the specific working procedures of the modules, and will not be repeated herein in order to make the description convenient and concise.

Figure 11:
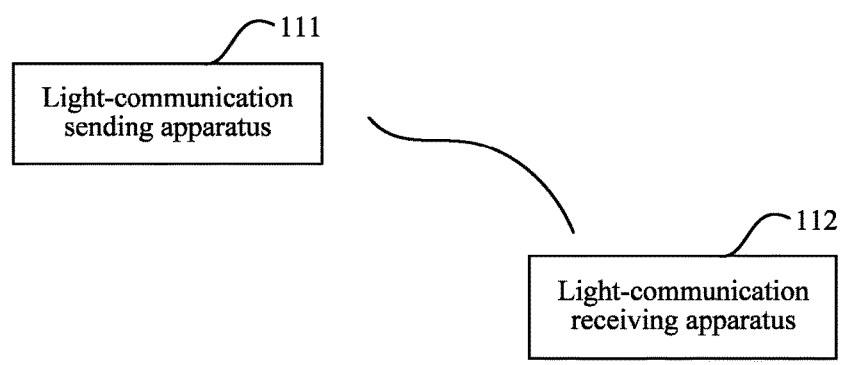
FIG. 11 is an optional logical block diagram of a light communication system, according to an embodiment of the present application.

FIG. 11 is a logical block diagram of a light communication system according to an embodiment of the present application. As shown in FIG. 11, the light communication system provided in this embodiment of the present application comprises: a light-communication sending apparatus 111 and a light-communication receiving apparatus 112. The light-communication sending apparatus 111 may be any one of light-communication sending apparatus provided in the embodiments of the present application, and the light-communication receiving apparatus 112 may be any one of light-communication receiving apparatus provided in the embodiments of the present application. The light-communication sending apparatus 111 and the light-communication receiving apparatus 112 perform light communication. When the light-communication receiving apparatus 112 with resolution differentiated captures an image displayed by the light-communication sending apparatus 111, differentiated communication information modulated by the light-communication sending apparatus 111 may be received, thereby improving the transmission efficiency of communication information and meeting diversified actual application demands of users. For the description of optional structures, mechanisms, methods, and the like related to the apparatus, reference may be made to the disclosure of other parts of the embodiments of the present application, which is no longer repeated herein.

In the various embodiments of the present application, the serial numbers and/or sequence numbers of the embodiments are merely for the convenience of description, and do not imply the preference among the embodiments. Particular emphasis is put on the description about each embodiment, and reference can be made to relevant description of other embodiments for the content not detailed in an embodiment. Reference can be made to the description about the corresponding method embodiments for related description about the implementation principle or process of relevant apparatus, device or system embodiments, which is not repeated herein.

It can be appreciated by those of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. Those skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on such understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing storage medium comprises various mediums capable of storing program codes, such as, a USB flash drive, a removable hard disk, a read-only memory (ROM), a random access memory (RAM), a magnetic disk or an optical disc.

In the embodiments of the apparatus, method, and system of the present application, apparently, the parts (a system, a subsystem, a module, a sub-module, a unit, a subunit, and the like) or steps may be decomposed or combined, and/or decomposed first and then combined. These decomposition and/or combination should be considered as equivalent solutions of the present application. In the above descriptions of the specific embodiments of the present application, a feature described and/or shown for one implementation may be used in one or more of other implementations in the same or similar manner and combined with a feature in another implementation, or replace a feature in another implementation.

It should be emphasized that, terms "comprise/include" used herein refer to existence of a feature, an element, a step, or a component, but do not exclude existence or addition of one or more of other features, elements, steps, or components.

Finally, it should be noted that, the foregoing implementations are only used to describe the present application, but not to limit the present application. Those of ordinary skill in the art can still make various alterations and modifications without departing from the spirit and scope of the present application; therefore, all equivalent technical solutions also fall within the scope of the present application, and the patent protection scope of the present application should be subject to the claims.

What is claimed is:

1. A light-communication sending method, comprising:
   acquiring a first region of an image;
   determining, according to the first region, information about density distribution of communication information that is to be modulated to light emitted by a light source, wherein the density distribution of communication information corresponds to pixel density distribution of an image sensor with adjustable pixel density, and the image sensor is configured to receive the light; and
   controlling the light source to display the image, and during displaying of the image, modulating, according to the information about the density distribution of the communication information, the communication information to the light emitted by the light source.

2. The method of claim 1, wherein, in the information about the density distribution of the communication information, communication information density corresponding to light, which is used to display the first region, of the light source is different from communication information density corresponding to light, which is used to display a second region, of the light source, the second region comprising at least a part of a region of the image except the first region.

3. The method of claim 2, wherein communication information that is modulated to the corresponding light, which is used to display the first region, of the light source is related to image content of the first region.

4. The method of claim 1, before the acquiring the first region of the image, further comprising:
   determining that pixel density of an image sensor of a receiver end is adjustable.

5. The method of claim 1, further comprising:
   sending a pixel density adjustment instruction, wherein the pixel density adjustment instruction is used to instruct a receiver end to adjust the pixel density of the image sensor according to the first region, so that in the adjusted image sensor, pixel density of an imaging region corresponding to the first region is different from pixel density of an imaging region corresponding to the second region.

6. The method of claim 1, further comprising:
   providing information of the first region.

7. The method of claim 1, further comprising:
   providing a determining rule for the first region.

8. The method of claim 1, wherein the acquiring the first region of the image comprises:
   acquiring information of a region of interest (ROI); and
   determining the first region of the image according to the information of the ROI.

9. The method of claim 1, wherein the acquiring the first region of the image comprises:
   performing an image analysis on the image; and
   determining the first region of the image according to a result of the image analysis.

10. A light-communication receiving method, comprising:
    acquiring a first region of an image;
    adjusting pixel density distribution of an image sensor according to the first region; and
    capturing the image by using the adjusted image sensor, and during capturing of the image, receiving communication information modulated by a transmit end to light emitted by a light source that displays the image, wherein the pixel density distribution of the image sensor corresponds to density distribution of communication modulated to the light.

11. The method of claim 10, wherein, in the adjusted image sensor, pixel density of an imaging region corresponding to the first region is different from pixel density of an imaging region corresponding to a second region, the second region comprising at least a part of a region of the image except the first region.

12. The method of claim 10, wherein density of communication information received by the imaging region corresponding to the first region is different from density of communication information received by the imaging region corresponding to the second region.

13. The method of claim 10, wherein communication information received by the imaging region corresponding to the first region is related to image content captured by the imaging region corresponding to the first region.

14. The method of claim 10, further comprising: providing capability information indicating that the image sensor has adjustable pixel density.

15. The method of claim 10, wherein
before the adjusting the pixel density distribution of the image sensor according to the first region, the method further comprises: receiving a pixel density adjustment instruction; and
the adjusting the pixel density distribution of the image sensor according to the first region comprises: adjusting, in response to the pixel density adjustment instruction, pixel density of the image sensor according to the first region of the image.

16. The method of claim 10, wherein the acquiring the first region of the image comprises:
acquiring information of the first region from the transmit end.

17. The method of claim 10, wherein the acquiring the first region of the image comprises:
acquiring a determining rule for the first region; and
determining the first region of the image according to the determining rule.

18. The method of claim 10, wherein the adjusting the pixel density distribution of the image sensor according to the first region comprises:
determining target pixel density distribution information of the image sensor according to the first region; and
adjusting pixel density distribution of the image sensor according to the target pixel density distribution information.

19. The method of claim 18, wherein the adjusting the pixel density distribution of the image sensor according to the target pixel density distribution information comprises:
determining deformation control information of a controllable deformable material portion according to the target pixel density distribution information; and
controlling the controllable deformable material portion to produce deformation according to the deformation control information, so as to correspondingly adjust the pixel density distribution of the image sensor by means of the deformation of the controllable deformable material portion.

20. The method of claim 19, wherein the controllable deformable material portion may be prepared from at least one or more of the following controllable deformable materials: a piezoelectric material, an electroactive polymer, a photostrictive material and a magnetostrictive material.

21. A light-communication sending apparatus, comprising:
a first-region acquisition module, configured to acquire a first region of an image;
a communication information density distribution information determining module, configured to determine, according to the first region, information about density distribution of communication information that is to be modulated to light emitted by a light source wherein, the density distribution of communication information corresponds to pixel density distribution of an image sensor with adjustable pixel density, and the image sensor is configured to receive the light; and
a control module, configured to control the light source to display the image, and during displaying of the image, modulate, according to the information about the density distribution of the communication information, the communication information to the light emitted by the light source.

22. The apparatus of claim 21, wherein, in the information about the density distribution of the communication information, communication information density corresponding to light, which is used to display the first region, of the light source is different from communication information density corresponding to light, which is used to display a second region, of the light source, the second region comprising at least a part of a region of the image except the first region.

23. The apparatus of claim 21, wherein communication information that is modulated to the corresponding light, which is used to display the first region, of the light source is related to image content of the first region.

24. The apparatus of claim 21, further comprising:
a receive-end capability information determining module, configured to determine that pixel density of an image sensor of a receiver end is adjustable.

25. (Currently Presented) The apparatus of claim 21, further comprising:
a pixel density adjustment instruction sending module, configured to instruct a receiver end to adjust the pixel density of the image sensor according to the first region, so that in the adjusted image sensor, pixel density of an imaging region corresponding to the first region is different from pixel density of an imaging region corresponding to the second region.

26. The apparatus of claim 21, further comprising:
a first-region information providing module, configured to provide information of the first region.

27. The apparatus of claim 21, further comprising:
a first-region determining rule providing module, configured to provide a determining rule for the first region.

28. The apparatus of claim 21, wherein the first-region acquisition module comprises:
a region of interest (ROI) information acquisition sub-module, configured to acquire information of an ROI; and
an ROI determining sub-module, configured to determine the first region of the image according to the information of the ROI.

29. The apparatus of claim 21, wherein the first-region acquisition module comprises:
an image analysis sub-module, configured to perform an image analysis on the image; and
a first-region determining sub-module, configured to determine the first region of the image according to a result of the image analysis.

30. A light-communication receiving apparatus, applied on an image sensor with adjustable pixel density comprising:
a first-region acquisition module, configured to acquire a first region of an image;
a pixel density adjustment module, configured to adjust pixel density distribution of an image sensor according to the first region; and
a control module, configured to capture the image by using the adjusted image sensor, and during capturing of the image, receive communication information modulated by a transmit end to light emitted by a light source that displays the image; wherein the pixel density distribution of the image sensor corresponds to density distribution of communication modulated to the light.

31. The apparatus of claim 30, wherein, in the adjusted image sensor, pixel density of an imaging region corresponding to the first region is different from pixel density of an imaging region corresponding to a second region, wherein the second region comprises at least a part of a region of the image except the first region.

32. The apparatus of claim 30, wherein density of communication information received by the imaging region corresponding to the first region is different from density of communication information received by the imaging region corresponding to the second region.

33. The apparatus of claim 30, wherein communication information received by the imaging region corresponding to the first region is related to image content captured by the imaging region corresponding to the first region.

34. The apparatus of claim 30, further comprising:
a capability information providing module, configured to provide capability information indicating that the image sensor has adjustable pixel density.

35. The apparatus of claim 30, wherein
the apparatus further comprises a pixel density adjustment instruction receiving module, which is configured to receive a pixel density adjustment instruction; and
the pixel density adjustment module comprises a pixel density adjustment instruction responding sub-module, which is configured to adjust, in response to the pixel density adjustment instruction, pixel density of the image sensor according to the first region of the image.

36. The apparatus of claim 30, wherein the first-region acquisition module comprises:
a first-region information acquisition sub-module, configured to acquire information of the first region from the transmit end.

37. The apparatus of claim 30, wherein the first-region acquisition module comprises:
a first-region determining rule acquisition sub-module, configured to acquire a determining rule for the first region; and
a first-region determining sub-module, configured to determine the first region of the image according to the determining rule.

38. The apparatus of claim 30, wherein the pixel density adjustment module comprises:
a target pixel density distribution information determining sub-module, configured to determine target pixel density distribution information of the image sensor according to the first region; and
a pixel density distribution adjustment sub-module, configured to adjust pixel density distribution of the image sensor according to the target pixel density distribution information.

39. The apparatus of claim 38, wherein the pixel density distribution adjustment sub-module comprises:
a deformation control information determining unit, configured to determine deformation control information of a controllable deformable material portion according to the target pixel density distribution information; and
a deformation control unit, configured to control the controllable deformable material portion to produce deformation according to the deformation control information, so as to correspondingly adjust the pixel density distribution of the image sensor by means of the deformation of the controllable deformable material portion.

40. The apparatus of claim 39, wherein the controllable deformable material portion may be prepared from at least one or more of the following controllable deformable materials: a piezoelectric material, an electroactive polymer, a photostrictive material and a magnetostrictive material.

41. A light communication system, comprising:
the light-communication sending apparatus of claim 21; and
the light-communication receiving apparatus of claim 30.

42. A computer readable storage apparatus, comprising at least one executable instruction, which, in response to execution, causes a light-communication sending apparatus comprising a processor to perform operations, comprising:
acquiring a first region of an image;
determining, according to the first region, information about density distribution of communication information that is to be modulated to light emitted by a light source, wherein, the density distribution of communication information corresponds to pixel density distribution of an image sensor with adjustable pixel density, and the image sensor is configured to receive the light; and
controlling the light source to display the image, and during displaying of the image, modulating, according to the information about the density distribution of the communication information, the communication information to the light emitted by the light source.

43. A light-communication sending apparatus, characterized by comprising a processor and a memory, the memory storing computer executable instructions, the processor being connected to the memory through a communication bus, and when the apparatus for controlling task migration operates, the processor executing the computer executable instructions stored in the memory, so that the apparatus for controlling task migration executes operations, comprising:
acquiring a first region of an image;
determining, according to the first region, information about density distribution of communication information that is to be modulated to light emitted by a light source wherein, the density distribution of communication information corresponds to pixel density distribution of an image sensor with adjustable pixel density, and the image sensor is configured to receive the light; and
controlling the light source to display the image, and during displaying of the image, modulating, according to the information about the density distribution of the communication information, the communication information to the light emitted by the light source.

44. A computer readable storage apparatus, comprising at least one executable instruction, which, in response to execution, causes a light-communication receiving apparatus comprising a processor to perform operations, comprising:
acquiring a first region of an image;
adjusting pixel density distribution of an image sensor according to the first region; and
capturing the image by using the adjusted image sensor, and during capturing of the image, receiving communication information modulated by a transmit end to light emitted by a light source that displays the image; wherein the pixel density distribution of an image sensor corresponds to density distribution of communication modulated to the light.

45. A light-communication receiving apparatus, characterized by comprising a processor and a memory, the memory storing computer executable instructions, the processor being connected to the memory through a communication bus, and when the apparatus for controlling task migration operates, the processor executing the computer executable instructions stored in the memory, so that the apparatus for controlling task migration executes operations, comprising:
   acquiring a first region of an image;
   adjusting pixel density distribution of an image sensor according to the first region; and
   capturing the image by using the adjusted image sensor, and during capturing of the image, receiving communication information modulated by a transmit end to light emitted by a light source that displays the image; wherein the pixel density distribution of an image sensor corresponds to the density distribution of communication modulated to the light.

\* \* \* \* \*